(12) United States Patent
Van Giesen et al.

(10) Patent No.: US 9,902,342 B2
(45) Date of Patent: Feb. 27, 2018

(54) BULKHEAD INCLUDING A SUPPORT STRUCTURE AND AN ACOUSTIC COMPONENT

(71) Applicant: SABIC Global Technologies B.V., Bergen op Zoom (NL)

(72) Inventors: Roland Van Giesen, Geleen (NL); Amin Sedighiamiri, Geleen (NL); Amit Kulkarni, Evansville, IN (US); Dhanendra Nagwanshi, Farmington Hills, MI (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/518,036

(22) PCT Filed: May 26, 2016

(86) PCT No.: PCT/US2016/034306
§ 371 (c)(1),
(2) Date: Apr. 10, 2017

(87) PCT Pub. No.: WO2016/191548
PCT Pub. Date: Dec. 1, 2016

(65) Prior Publication Data
US 2017/0297511 A1    Oct. 19, 2017

(30) Foreign Application Priority Data

May 28, 2015 (IN) .............................. 1526DEL2015

(51) Int. Cl.
*B60R 13/08* (2006.01)
*B62D 25/08* (2006.01)
*B62D 65/02* (2006.01)

(52) U.S. Cl.
CPC ........ *B60R 13/0838* (2013.01); *B62D 25/082* (2013.01); *B62D 65/02* (2013.01)

(58) Field of Classification Search
CPC .. B60R 13/083; B60R 13/0838; B62D 25/082
(Continued)

(56) References Cited

U.S. PATENT DOCUMENTS 5,153,388 A  *  10/1992  Wittenmayer ............ B32B 5/18
                                                          181/290
6,827,180 B2     12/2004  Wilson
(Continued)

FOREIGN PATENT DOCUMENTS

FR      2929746 A1    10/2009
JP     359209935 A    11/1984
WO    2004013427 A1    2/2004

OTHER PUBLICATIONS

International Patent Application No. PCT/US2016/034306; Int'l Preliminary Report on Patentability; dated Dec. 7, 2017; 7 pages.

*Primary Examiner* — Jason S Morrow
(74) *Attorney, Agent, or Firm* — Baker Hostetler LLP

(57) ABSTRACT

A bulkhead (110) for separating an engine compartment (112) and a passenger compartment (114) including a support structure (320) including at least one reinforcement member (324) and a body (322) supported by the reinforcement member (324), a thermally insulative component (330) supported by the support structure (320), and an acoustic resonator (370) defining a plurality of openings that extend along a first direction from the thermally insulative component (330) toward the first resonator side and terminate at a location between the first resonator side and the second resonator side. The acoustic resonator (370) includes a
(Continued)

plurality of cells that each defines a respective first open volume that is in fluid communication with at least one of the plurality of openings.

15 Claims, 11 Drawing Sheets

(58) Field of Classification Search
USPC .................................................. 296/39.3, 70
See application file for complete search history.

(56) References Cited

U.S. PATENT DOCUMENTS

| | | |
|---|---|---|
| 8,397,865 B2 | 3/2013 | Douglas et al. |
| 2004/0055813 A1* | 3/2004 | Tsuiki ................ B60R 13/0815 |
| | | 181/204 |
| 2004/0129493 A1 | 7/2004 | Campbell |
| 2011/0056763 A1 | 3/2011 | Tanese et al. |
| 2011/0139542 A1 | 6/2011 | Borroni |
| 2013/0118831 A1 | 5/2013 | Kawai et al. |
| 2014/0013601 A1 | 1/2014 | Ayle |
| 2016/0059797 A1* | 3/2016 | Fushiki ................ B60R 13/083 |
| | | 296/39.3 |
| 2016/0159295 A1* | 6/2016 | Lee .................... B60R 13/0838 |
| | | 181/290 |

\* cited by examiner

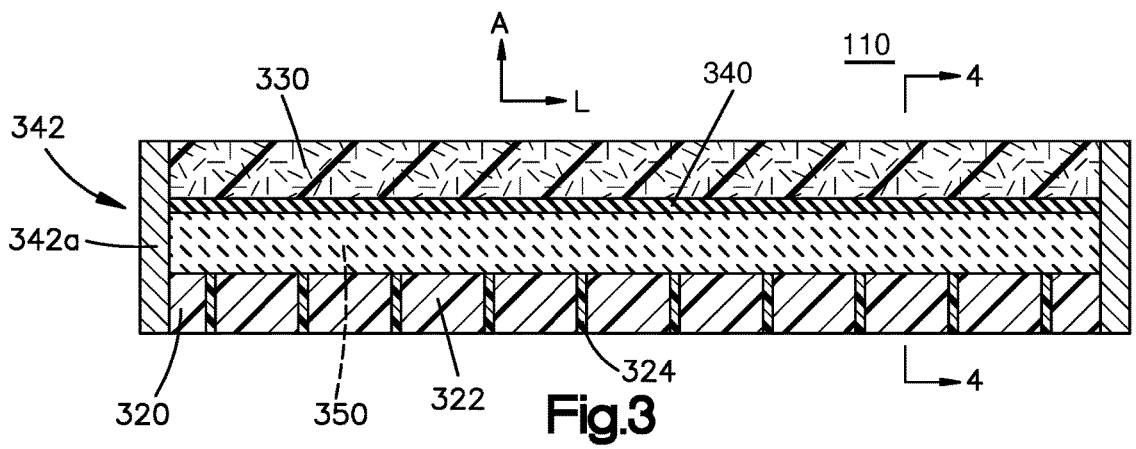
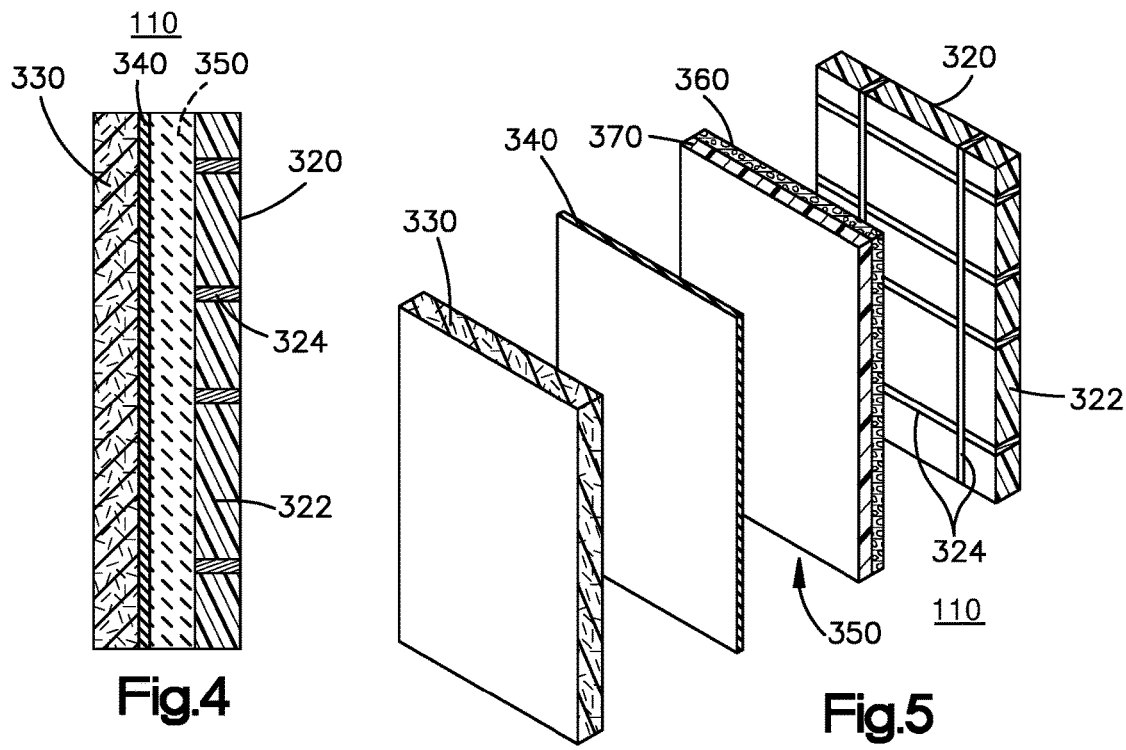
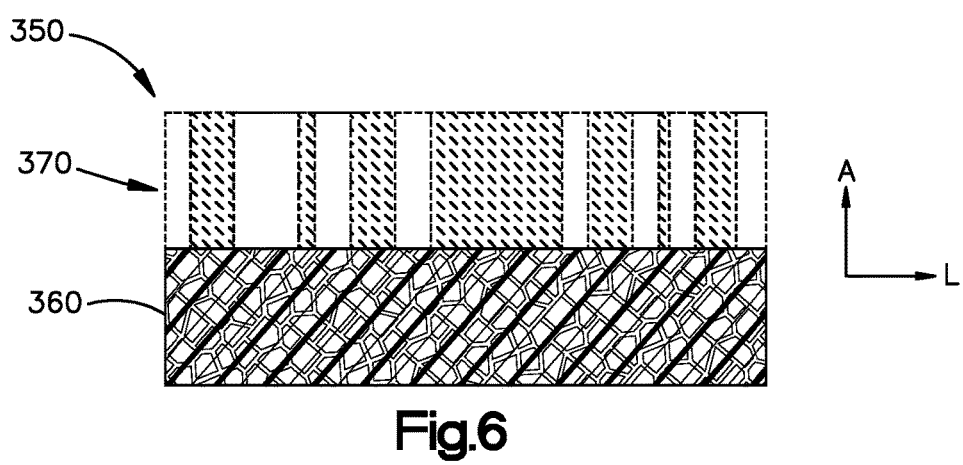

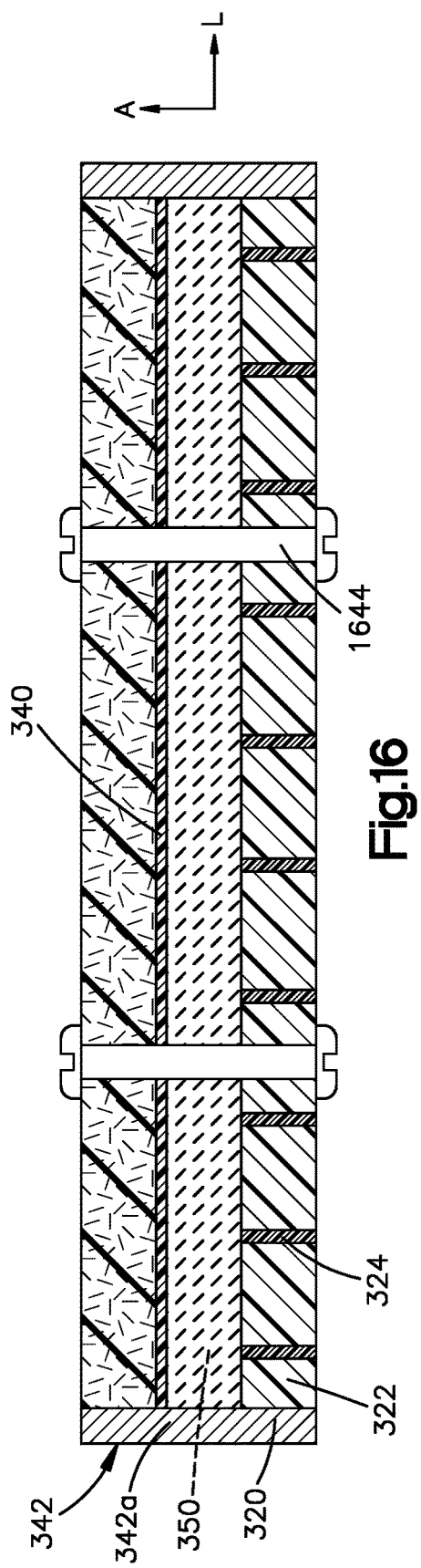
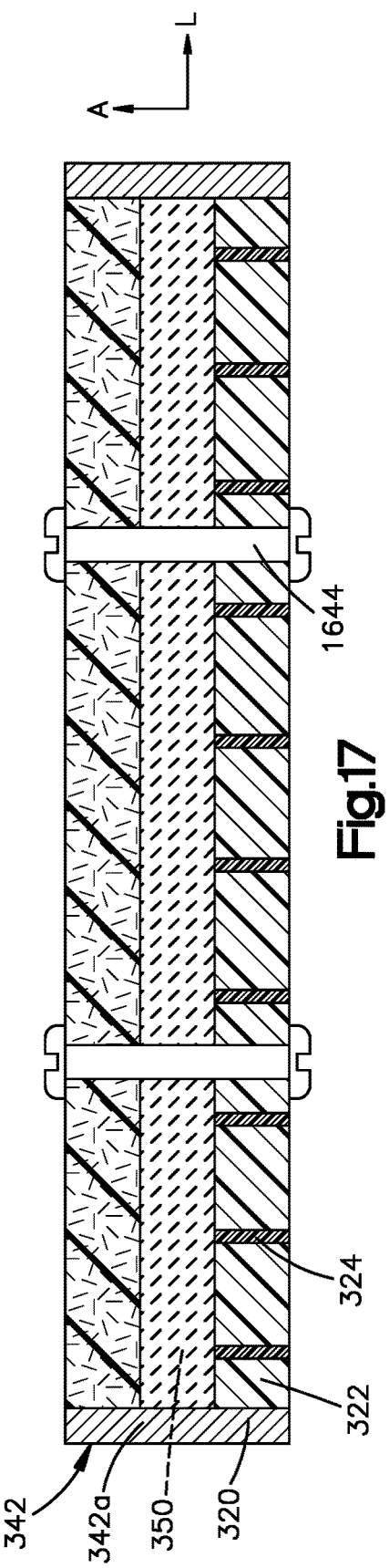

BULKHEAD INCLUDING A SUPPORT STRUCTURE AND AN ACOUSTIC COMPONENT

CROSS-REFERENCE TO RELATED APPLICATIONS

This application is the National Stage of International Application No. PCT/US2016/034306, filed May 26, 2016, which claims the benefit of India Provisional Application No. 1526/DEL/2015, filed May 28, 2015, the disclosures of which are incorporated herein by reference in their entireties.

BACKGROUND

Conventional automobiles include an automobile frame that defines various compartments of the automobile. Two such compartments are an engine compartment and a passenger compartment which are defined by the automobile frame to be adjacent to one another. As the engine compartment houses an engine of the automobile, substantial amounts of heat energy and noise may be generated during the operation of the engine, and potentially transmitted into the passenger compartment. The automobile may include a bulkhead, constructed of certain materials having substantial weight, which may cause installation to be difficult. In addition, such a bulkhead may be limited in its ability to dampen noise from the engine compartment which may be considered to be a nuisance to persons in a passenger compartment.

SUMMARY

The following Summary is provided to introduce a selection of concepts in a simplified form, including problems to be solved, which are further described below in the Detailed Description. This Summary is not intended to identify key features or essential features of the disclosure, nor is it intended to be used to limit the scope of the subject matter described herein. Reference will be made to the claims for that purpose.

As will be apparent from the disclosure, problems and/or objectives for improvement with respect to bulkhead construction, as recognized herein, may include providing a lightweight bulkhead for separating an engine compartment from a passenger compartment, while having a sufficient capability to prevent or minimize the effects of thermal runaway or a thermal anomaly. In addition, a need also exists for a bulkhead that prevents or reduces the effects of thermal runaway, while at the same time dampens an acoustic signature that may be produced during the operation of an automobile and detectable by, and even bothersome to, a passenger within the passenger compartment of an automobile.

Accordingly, aspects of the disclosure provide possible improvements to a bulkhead which may address, among others, the issues identified herein. In particular, according to one aspect of the disclosure, a bulkhead is configured to be coupled to an automobile frame between an engine compartment and a passenger compartment. The bulkhead includes a support structure including a body and at least one reinforcement insert embedded within at least a portion of the body, a thermal component positioned on a side of the support structure configured to be disposed proximate to the engine compartment, at least one mounting portion, and an acoustic component positioned between the support structure and the thermal component. The acoustic component may define a plurality of openings on a side of the acoustic component disposed proximate to the thermal component. The acoustic component may include a plurality of cells extending in a first direction from the support structure towards the thermal component, and each cell may define a volume in fluid communication with at least one opening. A cross-sectional area of each opening may be less than a cross-sectional area of a corresponding volume.

In one aspect, a bulkhead is configured to be disposed between an engine compartment and a passenger compartment, the bulkhead includes a support structure defining a first support side configured to face the engine compartment, and a second support side opposite the first support side, the support structure including at least one reinforcement member and a body supported by the reinforcement member, a thermally insulative component supported by the first support side of the support structure, and an acoustic resonator defining a first resonator side that faces the support structure, a second resonator side that faces the thermally insulative component, and a plurality of openings that extend along a first direction from the second resonator side toward the first resonator side and terminate at a location between the first resonator side and the second resonator side, wherein the acoustic resonator includes a plurality of cells that each defines a respective first open volume that is in fluid communication with at least one of the plurality of openings, and wherein each of the plurality of openings defines a respective cross-sectional area along a first plane that is oriented perpendicular to the first direction, each of the respective first open volumes defines a respective cross-sectional area along a second plane that is parallel to the first plane, and the respective cross-sectional area of each of the plurality of openings is less than the respective cross-sectional area of each of the first open volumes.

In one aspect, a method of fabricating a bulkhead includes providing a support structure defining a first support side configured to face an engine compartment, and a second support side opposite the first support side, the support structure including at least one reinforcement member and a body supported by the reinforcement member, providing a thermally insulative component supported by the first support side of the support structure, and providing an acoustic resonator defining a first resonator side that faces the support structure, a second resonator side that faces the thermally insulative component, and a plurality of openings that extend along a first direction from the second resonator side toward the first resonator side and terminate at a location between the first resonator side and the second resonator side, wherein the acoustic resonator includes a plurality of cells that each defines a respective first open volume that is in fluid communication with at least one of the plurality of openings, and wherein each of the plurality of openings defines a respective cross-sectional area along a first plane that is oriented perpendicular to the first direction, each of the respective first open volumes defines a respective cross-sectional area along a second plane that is parallel to the first plane, and the respective cross-sectional area of each of the plurality of openings is less than the respective cross-sectional area of each of the first open volumes.

BRIEF DESCRIPTION OF THE DRAWINGS

FIG. 3 is a schematic cross-sectional top view of a bulkhead of FIG. 2;

FIG. 4 is a schematic cross-sectional side elevation view the bulkhead of FIG. 2, taken along section line 4-4;

FIG. 5 is a schematic exploded cross-sectional side elevation view of a bulkhead, according to one aspect of the disclosure;

FIG. 6 is an enlarged portion of the acoustic damping component of FIG. 5;

FIG. 16 is a schematic cross-sectional top view of a bulkhead, according to one aspect of the disclosure.

FIG. 17 is a schematic cross-sectional top view of a bulkhead, according to one aspect of the disclosure.

DETAILED DESCRIPTION

Figure 1:
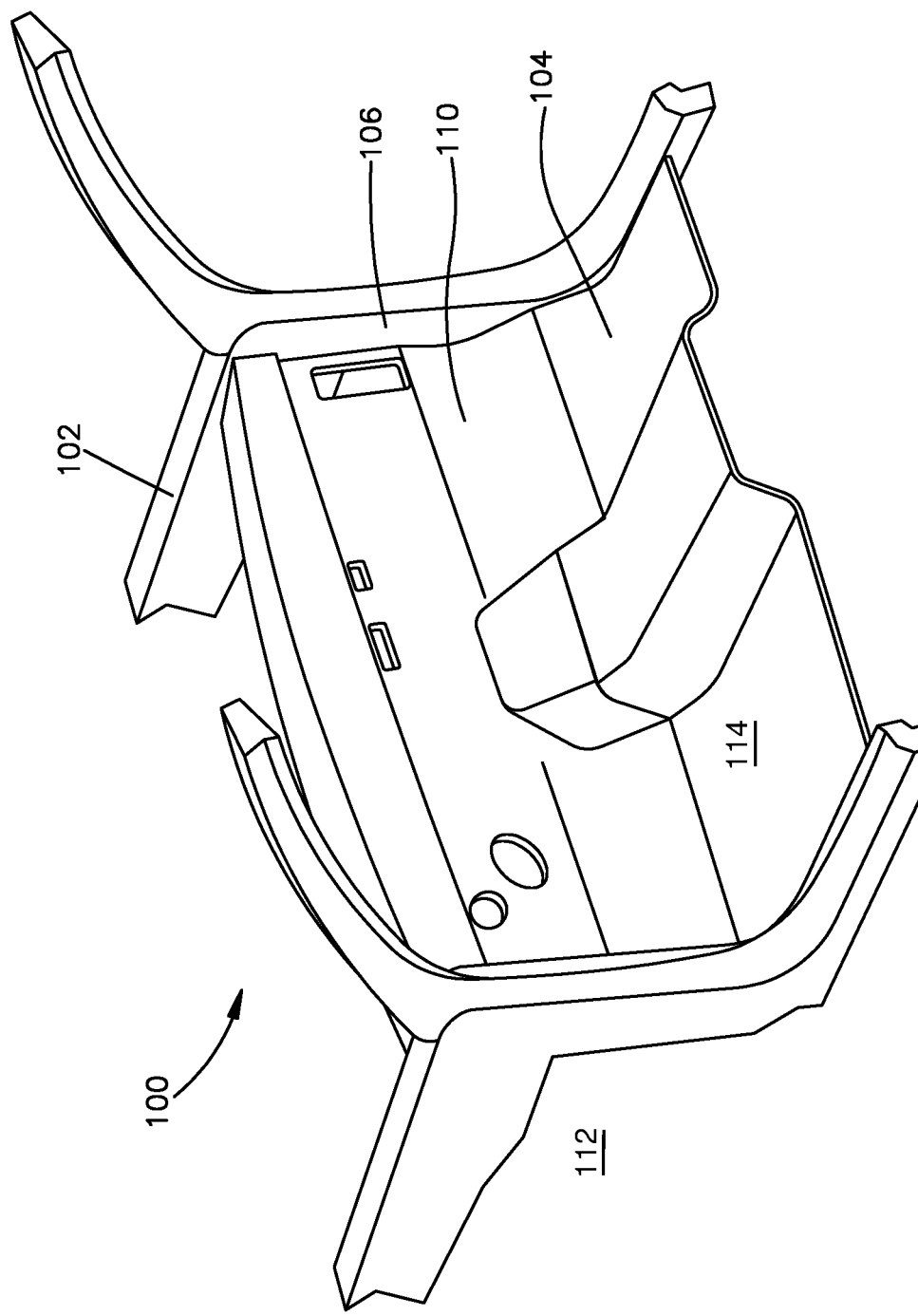
FIG. 1 illustrates a rear perspective view of an automobile frame assembly, according to one aspect of the disclosure.

Aspects of the disclosure will now be described in detail with reference to the drawings, wherein like reference numerals designate identical or corresponding parts throughout the several views, unless specified otherwise.

FIG. 1 illustrates a rear perspective view of an automobile frame assembly 100, according to an aspect of the disclosure. The automobile frame assembly 100 includes an automobile frame 102, a transmission tunnel 104, side panels 106, and a bulkhead 110 positioned between the side panels 106 above the transmission tunnel 104. The bulkhead 110 providing a partition suitable for separating compartments of an automobile as described herein. The bulkhead 110 may be attached to any of, and up to all of, the automobile frame 102, the transmission tunnel 104, and the side panels 106.

Figure 2:
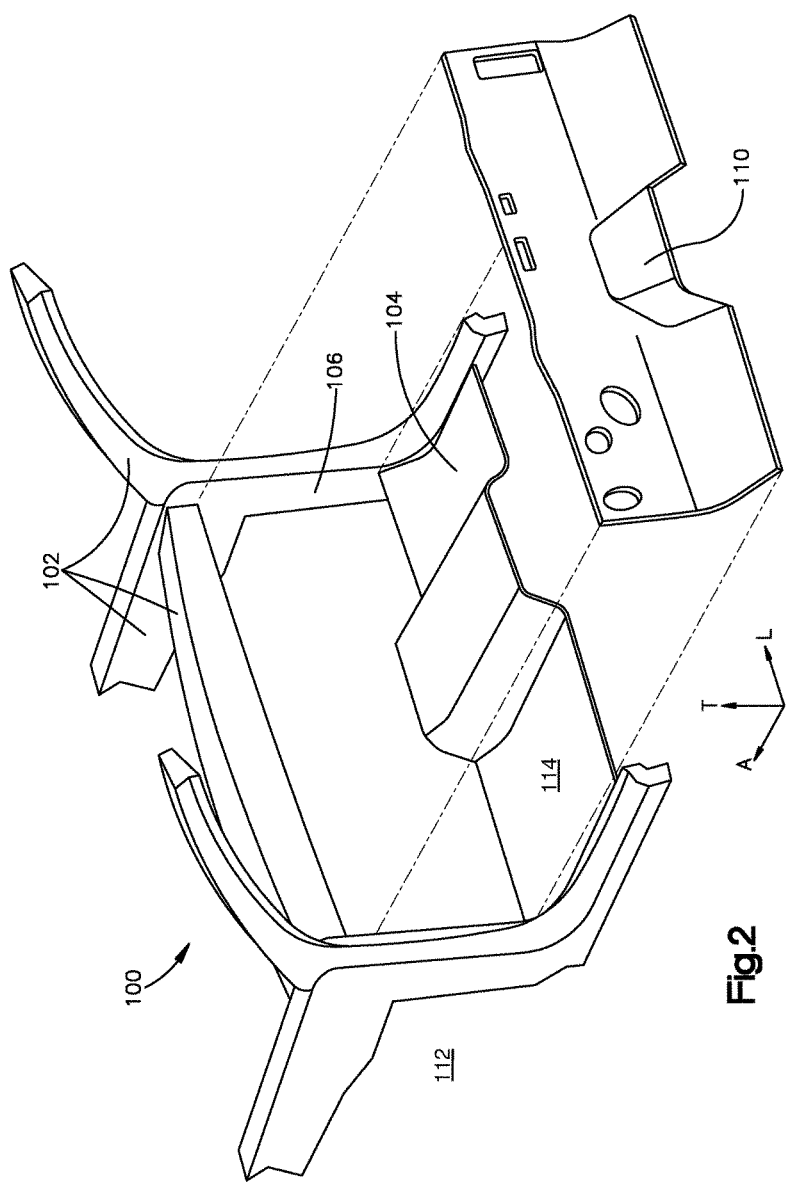
FIG. 2 is a rear perspective view of a partially exploded view of an automobile frame assembly, according to one aspect of the disclosure.

FIG. 2 illustrates a partially exploded view of the automobile frame assembly 100 of FIG. 1, according to an aspect of the disclosure. In particular, the bulkhead 110 has been isolated from the remainder of the automobile frame 102 to illustrate that the bulkhead 110 provides a front of car separating an engine compartment 112 from a passenger compartment 114. It will be understood that the bulkhead 110 includes at least one mounting portion (not shown), as described in more detail below, which receives various types of fasteners and/or is capable of being bonded, for example by welding, to at least the automobile frame 102, and potentially to the transmission tunnel 104 and the side panels 106. Further, the at least one mounting portion may extend from any edge of the bulkhead 110 and may be fastened to the automobile frame 102 and may provide an air tight attachment thereto.

The bulkhead 110 extends between the side panels 106 along a longitudinal direction L. The longitudinal direction L is perpendicular to a first direction A along which the bulkhead separates the engine compartment 112 from the passenger compartment 114. A dimension along the first direction defines a thickness of the bulkhead 110 and components thereof. Further, the longitudinal direction L is perpendicular to a second direction T along which the bulkhead 110 is positioned above the transmission tunnel 104.

FIG. 3 illustrates a schematic cross-sectional top view of the bulkhead 110 of FIG. 2. The bulkhead 110 includes a support structure 320, a thermal component 330, and a main coupler 342 attached at least to the support structure 320. An acoustic component 350 is positioned between the support structure 320 and the thermal component 330. The support structure 320 includes a body 322 and at least one reinforcement insert 324 embedded within at least a portion of the body 322. The thermal component 330 may be positioned on a side of the support structure 320 configured to be disposed proximate to the engine compartment 112. An adhesive component 340 may be provided between the thermal component 330 and the acoustic component 350 to attach the thermal component 330 to the bulkhead 110.

The at least one mounting portion of the bulkhead 110 may be provided, at least in part, by the main coupler 342 positioned on edges of the bulkhead 110 opposite to each other along the longitudinal direction L. In particular, a coupler body 342a may be attached to any one or all of the support structure 320, the thermal component 330, and the acoustic component 350 on one or both edges of the bulkhead 110. The bulkhead 110 may include multiple main couplers 342 attached and/or extending from edges of the bulkhead 110 which extend along the longitudinal direction.

According to one aspect of the disclosure, the main coupler 342 may attach the bulkhead 110 to the automobile frame 102, the transmission tunnel 104, and/or the side panels 106. The main coupler 342 includes the coupler body 342a that extends along the first direction. A plurality of holes (not shown) may extend through the coupler body 342a along the first direction. The plurality of holes may receive fasteners for attaching the bulkhead to the automobile frame 102, transmission tunnel 104, and/or the side panels. Alternatively, or in addition to the plurality of holes, at least one surface of the coupler body 342a may be formed from a material capable of being welded to the automobile frame 102. The surface may extend along an entire extent of the bulkhead 110 along a respective one of the longitudinal direction L, the first direction A, and the second direction T.

The main coupler 342 may be attached to any one or all of the support structure 320, thermal component 330, or the acoustic component 350 by a structural adhesive or other type of adhesive. Alternatively, the main coupler may include a reinforcement insert (not shown) that extends from the coupler body 342a towards the bulkhead 110 along the longitudinal direction. Such an extension member may be formed with the support structure 320 during an injection molding process. In particular, the extension may be overmolded as an insert in the body 322 of the support structure 320, and provide the bulkhead 110 with improved structural rigidity. As illustrated in FIG. 3, a thickness of the main coupler 342 may define a thickness of the bulkhead 110 along the first direction A. It will be understood that the coupler body 342a may extend along the first direction less than a combined thickness of the support structure 320, the acoustic component 350, and the thermal component 330.

The support structure 320, the thermal component 330, and the acoustic component 350 may be fabricated by one or multiple injection processes, in addition to other fabrications processes described herein. Thus, the bulkhead 110 according to the disclosure may include one or more components formed from light weight plastic material, and include structurally rigid components distributed within the bulkhead 110 such that an overall weight of the bulkhead is reduced, without, or with only minimal, decrease of the overall strength of an assembly providing a bulkhead.

FIG. 4 illustrates a schematic cross-sectional side elevation view of the bulkhead 110 of FIG. 2, taken along section line 4-4. The thermal component may include a heat shield, an aluminum structure, a layer of glass wool or engineering thermoplastic (ETP) suited for high temperatures, or be in the form of a laminate, silver coatings, or a ceramic capable of being sprayed onto the bulkhead 110. The adhesive component 340 may include a structural adhesive or an injection molded self-fixation element, and attach the thermal component 330 to the acoustic component 350. It will be appreciated that the adhesive component may also be a mechanical fastener or other mechanism. Alternatively, the thermal component 330 may be attached to the bulkhead 110 as an insert during an injection molding process. Still further, the thermal component 330 may be formed as a thermoplastic member and combined with the acoustic component 350 during an injection molding process.

A thermal conductively of the thermal component 330 may be less than at least a thermal conductivity of the support structure 320. Accordingly, the thermal component 330 may prevent or reduce the effects of thermal runaway or a thermal anomaly.

FIG. 5 illustrates a schematic exploded cross-sectional side elevation view of a bulkhead 110, according to an aspect of the disclosure. It will be noted that the reinforcement inserts 324 may localized to the support structure 320 and may be arranged to extend completely through the bulkhead 110 along each of the longitudinal direction L, the first direction A, and the second direction T. Accordingly, the reinforcement inserts 324 may be in the form of a frame that is overmolded during an injection molding process for constructing the support structure 320. According to one aspect of the disclosure, the reinforcement inserts 324 may be formed from a material capable of being welded to the automobile frame 102. According to yet another aspect of the disclosure, the reinforcement inserts 324 may be formed from material that can be welded and arranged into the frame configuration, may extend through at least a portion of a thickness of the body 322 of the support structure 320 and past the support structure 320 toward the passenger compartment 114. Accordingly, the reinforcement inserts 324 may provide a frame that may be welded to the automobile frame 102.

Alternatively, each reinforcement insert 324 may be positioned within the bulkhead 110 for only a portion of a dimension of the bulkhead 110 in up to all of the longitudinal direction L, the first direction A, and the second direction T. For example, reinforcement inserts 324 extending along the longitudinal direction L may only extend across a first half of the thickness of the body 322 along the first direction A, and reinforcement inserts 324 extending along the second direction T may only extend across a second half of the thickness of the body 322 along the first direction A. It will be understood that the reinforcement inserts 324, if provided, may be arranged to extend in directions oblique to any of the longitudinal direction L, the first direction A, and the second direction T.

FIG. 5 further illustrates an aspect of the acoustic component 350 that includes a foam layer 360 and a resonator 370. As will be explained with reference to FIGS. 6-12, the foam layer 360 and the resonator 370 may provide acoustic damping of noise generated in the engine compartment 112.

FIG. 6 illustrates an enlarged portion of the acoustic component 350 of FIG. 5. The acoustic component 350 includes the foam layer 360 and the resonator 370. The foam layer 360 may extend from the resonator 370 towards the support structure 320 along the first direction A. The foam layer 360 may be formed by a chemical foam or a physical foam. The foam layer 360 may be attached to the support structure 320 by a layer of structural adhesive. Alternatively, the foam layer 360 may be monolithic with one or both of the support structure 320 and the resonator 370. As such, the foam layer 360 and the resonator may be formed in an injection molding process using the same ETP material. In addition, the foam layer 360 may be formed from the same or different ETP, and not monolithic with the resonator 370. Accordingly, the resonator 370 can be molded onto the resonator 370 according to an injection molding process. Alternatively, the foam layer 360 may be attached to the resonator 370 by an adhesive.

As will be described in further detail with respect to FIGS. 7-12, the resonator 370 may be configured as a Helmholtz resonator including a plurality of cells which define volumes therein. As described in more detail below, the cells may be sized such that volumes defined therein are tuned to absorb mechanical wave energy (e.g. component vibrations, longitudinal waves such as sound waves, etc.). Thus, the resonator 370 may be tuned to absorb any type of wave that transfers energy through a medium and which could cause buzz, squeak, and rattle (BSR) to occur. For example, the resonator 370 could be tuned to a resonate frequency of the automobile frame 102, or an excitation frequency of at least a portion of a region defined within the automobile frame assembly, preferably a region within the engine compartment 112. Further, as will become apparent from the description that follows, the resonator 370 may be provided by different resonator assemblies.

Figure 7A:
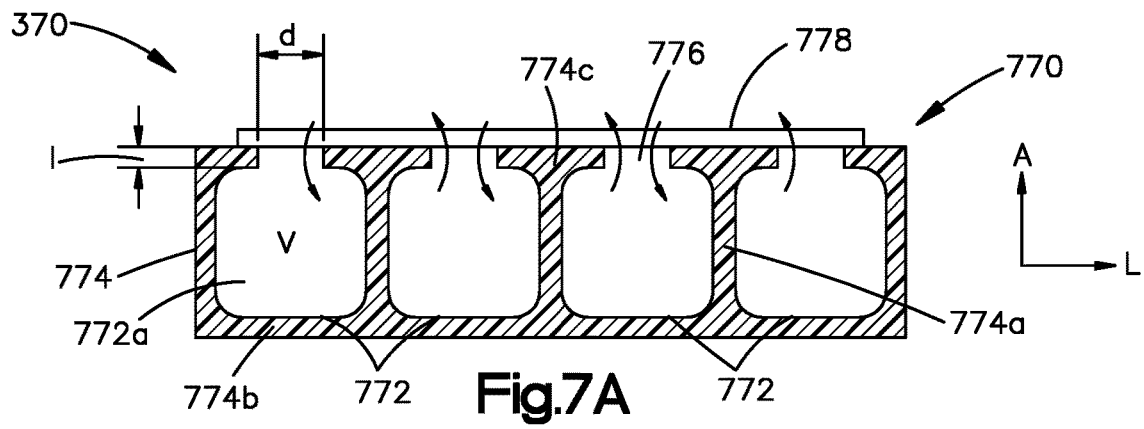
FIG. 7A is a cross-sectional side elevation view of a resonator assembly, according to one aspect of the disclosure.
Figure 7B:
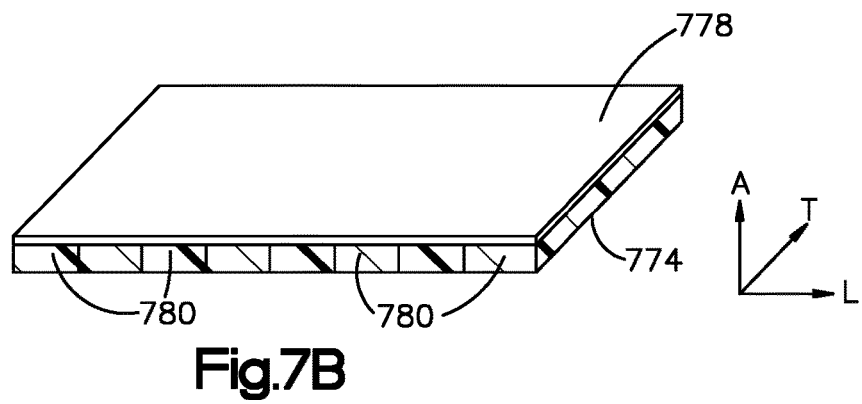
FIG. 7B is a perspective view of the resonator assembly illustrated in FIG. 7A.
Figure 7C:
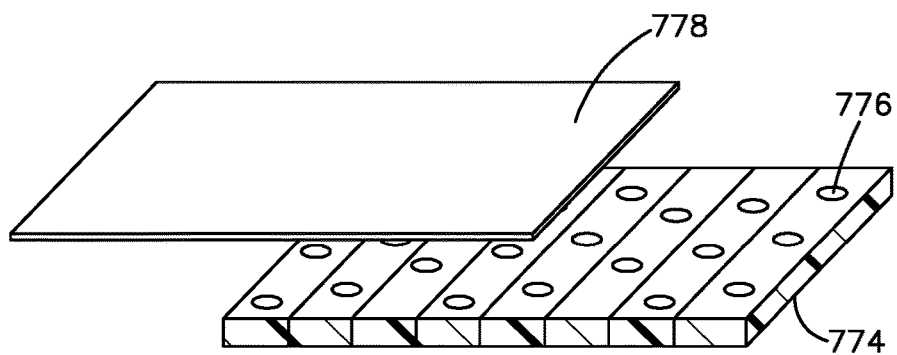
FIG. 7C is an exploded perspective view of the resonator assembly illustrated in FIG. 7B.

FIG. 7A-C illustrate a resonator assembly 770 of the resonator 370, according to an aspect of the disclosure. The resonator assembly 770 includes a housing 774 which is divided into a plurality of cells 772. The housing 774 may be a double wall sheet (774a, 774b, 774c) including first walls 774a extending along the first direction A, a second wall 774b disposed proximate to the support structure 320, and a third wall 774c disposed proximate to the thermal component 330. A plurality of openings 776 may be formed within the third wall 774c. It will be appreciated that the double wall sheet (774a, 774b. 774c) may provide a bulkhead 50% less in weight than a comparable bulkhead using a metal sheet.

As illustrated in FIGS. 7A and 7B, the resonator assembly 770 may include a fabric layer 778 attached to the third wall 774c. FIG. 7C illustrates the fabric layer 778 removed from the third wall 774c, which reveals the arrangement of cells 772 in the rows 780. The fabric layer 778 may be formed from any material that increases an acoustic damping capability of the resonator 370.

The cells 772 may extend in the first direction A from the support structure 320 towards the thermal component 330. Each cell 772 defines a first volume 772a in fluid communication with at least one opening 776 of the plurality of openings 776. A cross-sectional area of each opening 776 of the plurality of openings 776 is less than a cross-sectional area of a corresponding volume 772a. As illustrated in FIG. 7C, the cells 772 are arranged with rows 780 defined by the first walls 774a.

A dimension along the longitudinal direction L corresponds to a length of each cell 772 and a length of each row, and a respective dimension along the second direction T corresponds to a height of each cell 772 and a height of each row 780. The height and length of for a given cell 772 determines a size of a respective volume 772a. As illustrated in FIG. 7A, for each opening 776, a dimension along the first direction A defines a thickness (l), and a dimension along the longitudinal direction L may correspond to a diameter (d) of the opening 776. Together the cells 772 and openings 776 combine to create a Helmholtz resonator with each cell having a respective resonant frequency according to the following equation:

$$f_r = \frac{v}{4}\sqrt{\frac{1}{\pi V(l + 0.75d)}}$$

where:
$f_r$: Resonant frequency [hertz (Hz)]
V: Volume of resonance chamber (i.e. first volume 772a) [millimeter$^3$ (mm$^3$)]
d: Diameter of opening [millimeter (mm)]
l: Depth of opening (i.e. thickness) [mm]
v: Speed of sound—approx. 344000 [millimeter per second (mm/sec)]

Thus, modifying dimensions of the cells 772 and openings 776 will change the resonant frequency of the cells 772, and thus the resonator 370. In particular, a larger opening 776 (d) will result in a higher frequency due the ability of a fluid (e.g. air) to flow in and out of a respective cell 772 at higher speed. A larger volume (V) will yield a lower frequency because more fluid must move from a given cell 772 to relieve a given pressure in the cell 772. In addition, increasing a thickness (l) of an opening 776 will yield a lower frequency due to an increase in resistance for a fluid to move in and out of the given cell 772.

The plurality of rows 780 may be arranged along the longitudinal direction L, and each row 780 may extend along the second direction T. Respective lengths of the rows 780 may vary along the longitudinal direction L, or may be uniformly equal. In addition, respective heights of the cells 772 within each row 780 may be equal or vary along the second direction T.

Alternatively, the rows 780 may be arranged along the second direction T, and each row 780 may extend along the longitudinal direction L. The respective heights of the rows 780 may vary along the second direction T, or may be uniformly equal. In this configuration, the respective lengths of the cells 772 within each row 780 may vary along the longitudinal direction L, or may be uniformly equal. The housing 774 may be formed through a process, an injection molding process for example, such that lengths and heights the rows 780 and the cells 772 are sized so the volumes 772a are tuned according to a resonant frequency corresponding to an excitation frequency of a combined region adjacent to the bulkhead 110.

It will also be appreciated that the different groups of the rows 780 and the cells 772 along any of the longitudinal direction L, the first direction A, and the second direction T, may have a size profile for the respective cells 772 in each group. As a result, a given group of cells 772 may be tuned to a particular resonant frequency corresponding to an excitation frequency of a region immediately adjacent to the given group of cells 772. Thus, different sections of the bulkhead 110 can be tuned to optimize an overall acoustic damping effect of the bulkhead 110.

According to another aspect of the disclosure, each cell 772 may be defined as an entire row 780. According to this arrangement, each cell 772 may include a respective first volume 772a in fluid communication with more than one opening 776 defined by the third wall 774c of the housing 774. In this configuration, each cell 772 and/or row 780 may extend along the longitudinal direction L or the second direction T. In order to the tune various sections of the bulkhead 110 to different resonant frequencies as previously discussed, respective heights of the cells 772 and/or rows 780 extending along the longitudinal direction may be varied. Similarly, lengths of cells 772/rows 780 extending along the second direction may be varied when the housing 774 is formed, for example, by injection molding.

Similar to lengths and heights of the cells 772 and the rows 780, thicknesses (l) and sizes (d) of openings 776 may be varied or kept constant with a given group of cells 772 in order to tune the resonator 370.

It will be appreciated that the acoustic component 350, and components thereof, in particular the resonator 370, may be formed through a variety of fabrication processes, including but not limited to, rotation bench assembly, separate unit operations, insert injection molding, thermoforming specific components, and composite cell manufacturing.

Figure 8:
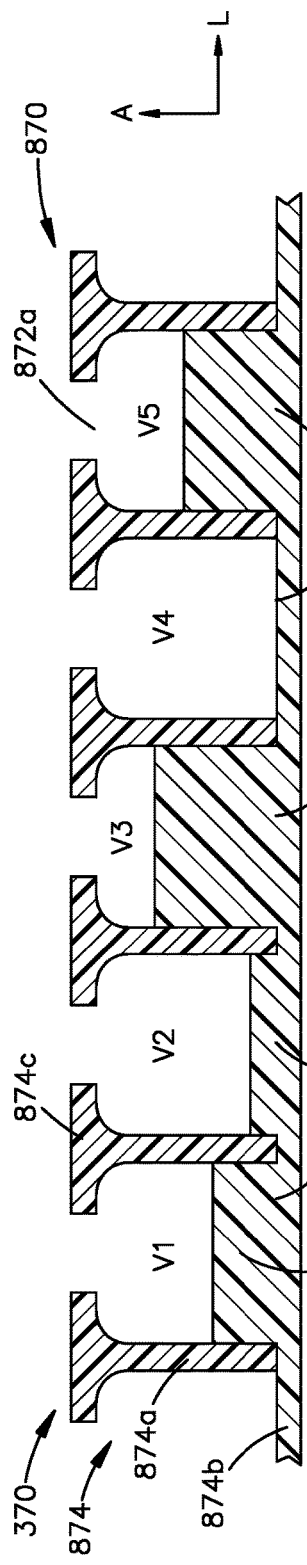
FIG. 8 is a schematic cross-sectional view of a portion of a resonator assembly, according to one aspect of the disclosure.

FIG. 8 illustrates a resonator assembly 870 of the resonator 370, according to an aspect of the disclosure. The resonator assembly 870 includes a housing 874 formed by a double wall sheet (874a, 874c) mounted on to mounting plate 874b. The first walls 874a of the double wall sheet (874a, 874c) extend along the first direction A and are arranged to define rows of cells 772. A second wall 874c of the double wall sheet (874a, 874c) defines openings 876 that are in fluid communication with respective volumes 872a of the cells 772. The volumes 872a are defined by the first walls 874a and protrusions 874d extending from the mounting plate 874b. The protrusions 874d are monolithic with the mounting plate 874b and define a profile thereof. Each protrusion 874d extends within a given cell 772 across a cross-sectional area of the volume 872a defined by the given cell 772. A fabric layer (not shown) may be attached to a side of the second wall 874c disposed proximate to the thermal component 330.

The protrusions 874d may extend a same distance along the first direction A from the mounting plate 874b, or may extend different respective distances. In a configuration in which the first walls 874a extend along the longitudinal direction L, a distance between adjacent first walls 874a define a height of each cell 772 within a row defined by the adjacent first walls 874a. In a configuration in which the first walls 874a extend along the second direction T, a distance between adjacent first walls 874a define a length of each cell 772 within a row defined by the adjacent first walls 874a. It will be appreciated that in either configuration, distances by which the protrusions 874d extend from the mounting plate 874b, and distances between adjacent first walls 874a may be varied along the longitudinal direction L, the first direction A, and the second direction T to provide desired volumes 872a. Accordingly, first walls 874a and the protrusions 874d can be configured such that the cells 772 are tuned according to a resonant frequency corresponding to an excitation frequency a combined region adjacent to the bulkhead 110, or in sections tuned to regions immediately adjacent to the sections respectively.

Figure 9:
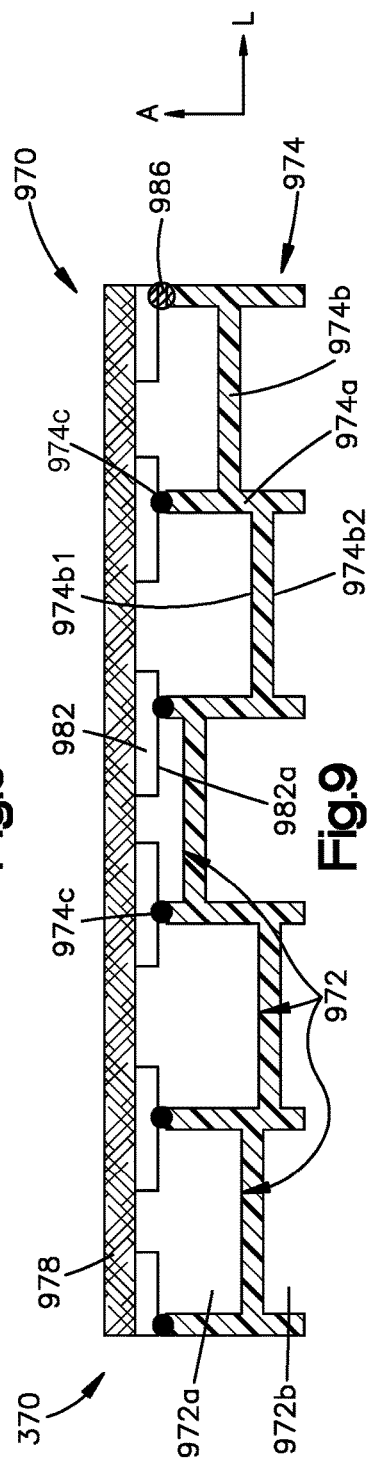
FIG. 9 is a schematic cross-sectional view of a resonator assembly, according to one aspect of the disclosure.

FIG. 9 illustrates a resonator assembly 970 of the resonator 370, according to an aspect of the disclosure. Each cell 972 is formed by a structure 974 that may include a pair of ribs 974a and a transverse wall 974b extending between a respective pair of ribs 974a. The ribs 974a may be formed from a first material. Further, the ribs 974a may be formed from inserts which are overmolded during an injection molding process. The ribs 974a may be arranged so as to extend along the longitudinal direction L or the second direction T. Alternatively, the ribs 974a may be arranged so as to be oblique to the longitudinal direction L and the second direction T.

The transverse walls 974b may be formed from the first material or a different material. As illustrated in FIG. 9, the transverse walls 974b extend parallel to longitudinal direction L. It will be understood that the transverse walls 974b may be curved or arranged at an angle relative to the longitudinal direction L. Each transverse wall 974b is positioned at a respective location along the first direction A. Each transverse wall 974b may be positioned along the first direction A so that a first volume 972a defined by a respective cell 972, may be tuned according to a resonant frequency corresponding to an excitation frequency of a combined region adjacent to the bulkhead 110, or according to a resonant frequency of a region immediately adjacent to the cell 972 or a group of cells 972 including the cell 972.

As illustrated in FIG. 9, a structural layer, such as a structural skin layer 982, may be attached to ends 974c of the plurality of ribs 974a that will be disposed proximate to the thermal component 330. The structural skin layer 982 may define openings 976 that are in fluid communication with volumes 972a defined by the cells 972. The structural skin layer 982 may be formed from a material including at least one metallic component, and may be welded to the ends of the plurality of ribs 974a. In some aspects, a fabric layer 978 may be arranged on the structural skin layer 982.

Alternatively, ends 974c of the ribs 974a or a surface 982a of the structural skin layer 982 disposed proximate to the ends 974c of the ribs 974a may be formed with a plurality of studs (not shown) extending therefrom. At the same time, the other of the ends 974c and the surface 982a may include slots (not shown) that correspond to the studs. According to this arrangement, the resonator assembly 970 of the resonator 370 is constructed, at least in part, by deforming studs into an interference fit with slots during a heat staking process.

Additionally, or as an alternative to the processes for attaching the structural skin layer 982 to the ribs 974a previously discussed, the structural skin layer 982 and the ribs 974a may be fastened together by a clip 986.

As illustrated in FIG. 9, each transverse wall 974b includes a first surface 974b1 that faces the structural skin layer 982, and thus the thermal component 330, along the first direction A. Further, each transverse wall 974b includes a second surface 974b2 that faces in the opposite direction as the first surface 974b1. For each cell 972, the first surface 974b1 defines a respective first volume 972a, and the second surface 974b2 defines a respective second volume 972b. As illustrated in FIG. 9, the second volumes 972b may be empty voids.

Figure 10:
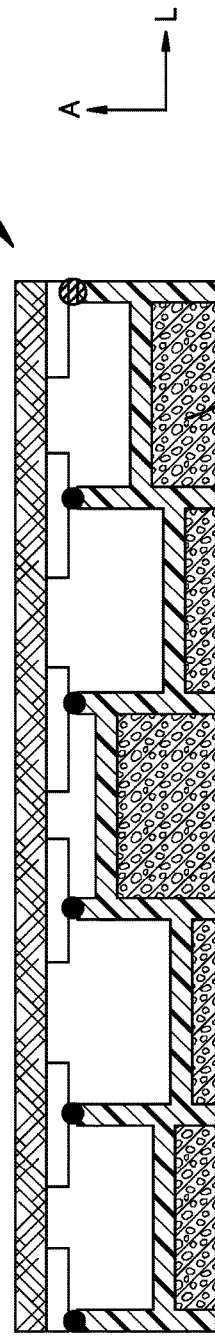
FIG. 10 is a schematic cross-sectional view of a resonator assembly, according to one aspect of the disclosure.
Figure 11:
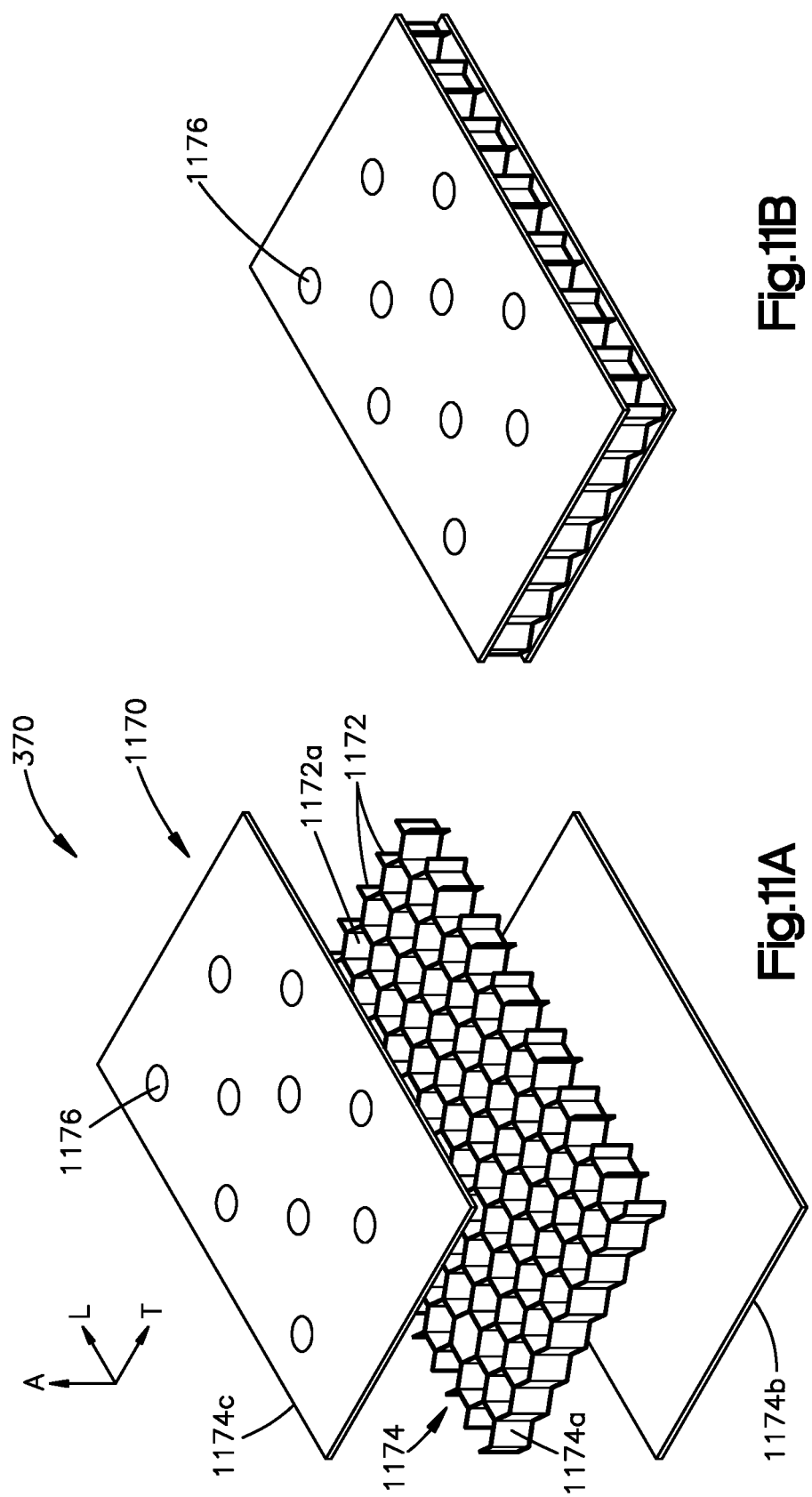
FIG. 11A is an exploded perspective view of a resonator assembly, according to one aspect of the disclosure.
FIG. 11B is a perspective view of the resonator assembly illustrated in FIG. 11A.

FIG. 10 illustrates the resonator assembly 970 of FIG. 9, modified according to an aspect of the disclosure. In particular, each second volume 972b is filled a body of foam 1088. Each body of foam may be composed of a structural foam and a chemical foam. The addition of the foam 1088 may improve the acoustic damping capabilities of the resonator 370 including the resonator assembly 970.

FIGS. 11A and 11B illustrate a resonator assembly 1170 of the resonator 370, according to an aspect of the disclosure. The resonator assembly 1170 includes a honeycomb matrix 1174a having a plurality of cells 1172 in a honeycomb arrangement. Each cell 1172 may be a polygon-shaped cell that defines a respective volume 1172a. A thermoplastic layer 1174b may be positioned between the support structure 320 and the honeycomb matrix 1174a including the cells 1172. The thermoplastic layer 1174b may be attached to the honeycomb matrix 1174a by an adhesive film (not shown). In another aspect of the disclosure, the thermoplastic layer 1174b may be monolithic with the honeycomb matrix 1174. A perforated thermoplastic layer 1174c may be attached to a side of the honeycomb matrix 1174a disposed proximate to the thermal component 330. The perforated thermoplastic layer 1174c may define a plurality of openings 1176, each opening 1176 being in fluid communication with a respective volume defined by one of the cells 1172. A fabric layer (not shown) may be attached to a side of the perforated thermoplastic layer 1174c that faces the honeycomb matrix 1174a or the thermal component 330.

The thermoplastic layer 1174b may include a plurality of protrusions (not shown) that extend from the thermoplastic layer 1174b in the first direction A towards the thermal component 330. Each protrusion may extend within one of the cells 1172 across a cross-sectional area of a respective volume 1172a defined by the cell 1172. Each protrusion may extend a same distance along the first direction A from the thermoplastic layer 1174b, or the protrusions may extend varying distances along the first direction A and the thermoplastic layer 1174b may be profiled layer.

Figure 12:
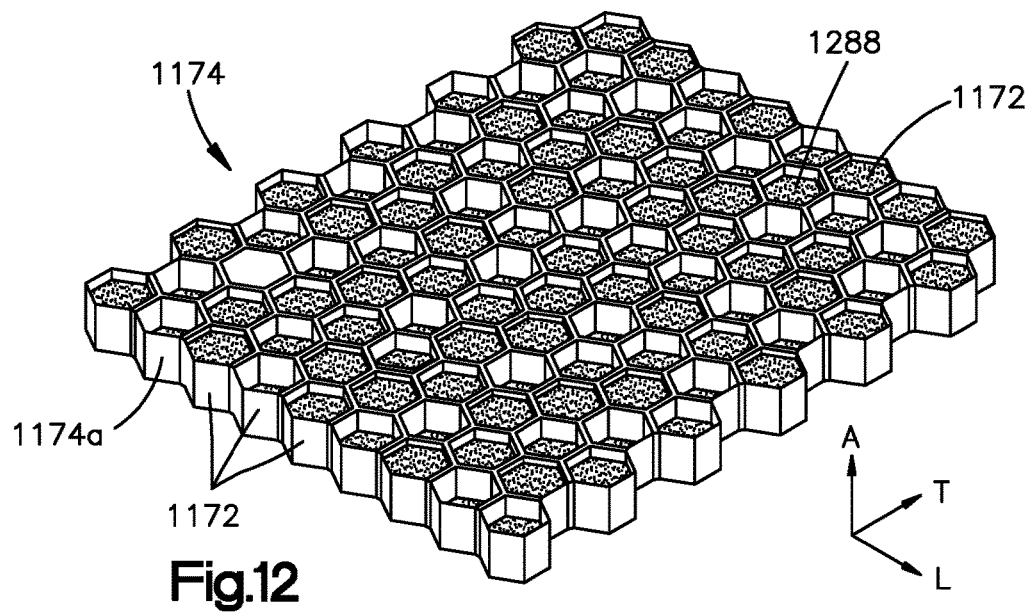
FIG. 12 is a schematic perspective view of a honeycomb matrix for the resonator assembly of FIGS. 11A and 11B.

FIG. 12 illustrates the honeycomb matrix 1176a of FIGS. 11A and 11B, modified according to an aspect of the disclosure. Instead of protrusions extending from the thermoplastic layer 1174b as previously described, each cell 1172 in at least a portion of the cells 1172 may include a body of material 1288 extending across the cross-sectional area of the volume 1172a defined by each cell 1172. Each body of material 1288 may extend a same distance from a same location within the cells 1172 along the first direction A, or bodies of material 1288 may extend varying distances from different locations within the cells 1172 along the first direction A. Each body of material 1288 may be formed by a foam material, such as a chemical foam or a physical foam.

In any of the configurations for the resonator assembly 1170 previously described, lengths and heights of the cells 1172, thicknesses of protrusions or bodies of material 1288 along the first direction A, and thicknesses or diameters of the openings 1176 may be individually sized according to target resonant frequencies of a combine region or portions of the combined region in a region defined by the automobile frame assembly 100 adjacent to the bulkhead 110.

Figure 13:
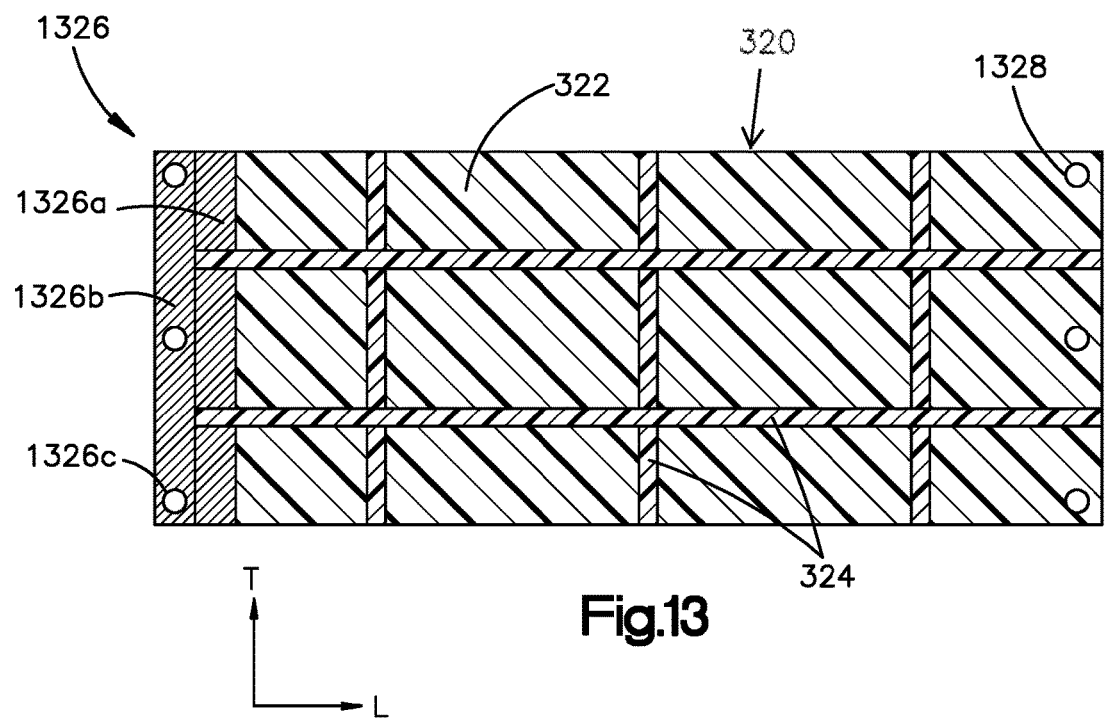
FIG. 13 is a schematic front elevation view of the bulkhead of FIG. 3.

FIG. 13 illustrates a schematic front elevation view of the bulkhead 110 of FIG. 3. The support structure 320 includes the reinforcement inserts 324. In addition to, or as a substitute for the reinforcement inserts 324, the support structure 320 may include a metal insert 1326. The metal insert 1326 may include a portion 1326a over which the body 322 of the support structure 320 is overmolded during an injection molding process. Thus, the metal insert 1326 may provide the support structure 320 with structural rigidity in addition to, or as a substitute for, that which may be provided by the reinforcement inserts 324.

The metal insert 1326 may extend from at least one edge of the support structure 320 along the longitudinal direction L. In addition, a portion 1326b of the metal insert 1326 extending past the support structure 320 and one or both of the acoustic component 350 and the thermal component 330, may include a series of holes 1326c. Fasteners (not shown) may be driven through the series of holes 1326c to attach the support structure 320, and therefore the bulkhead 110, to the automobile frame 102. Accordingly, the series of holes 1326c may provide the at least one mounting portion of the bulkhead 110. Alternatively, the fasteners could be driven through the series of holes 1326c to attach the support structure 320, the acoustic component 350, and thermal component 330 to the main coupler 342.

According to one aspect of the disclosure, the metal insert 1326 may not be provided. A structural rigidity of the support structure 320 may be provided exclusively with the reinforcement inserts 324 which are localized to the support structure 320 by being embedded within the body 322. The reinforcement inserts 324 may be formed by unidirectional tape or a resin impregnated fabric. The reinforcement inserts 324 may be formed from different materials, for example, some of the reinforcement inserts 324 may be formed from unidirectional tapes, whereas others may be formed from a resin impregnated fabric impregnated with glass fiber and/or carbon fiber. As described in more detail below, the support structure 320 may be formed with one or more extensions (not shown) which extend past one or more edges of the thermal component 330 and the acoustic component 350 for up to all of the longitudinal direction L, the first direction A, and the second direction T.

In the configuration including the extensions, a series of holes (not shown) may be formed (e.g. formed during an injection molding process) in the extensions of the support structure 320. Some holes in this series of holes may correspond to holes formed in the main coupler 342 illustrate in FIG. 3, and may receive fasteners which attach the support structure to the main coupler 342. Other holes in the series of holes formed in extensions of the support structure 320 may correspond to holes extending through the main coupler 342 which may receive fasteners to attach the support structure 320, the main coupler 342, and thus the bulkhead 110, to the automobile frame 102. Thus, together with the main coupler 342, the holes in the extensions may provide at least one mounting portion of the bulkhead 110.

As previously discussed, the support structure 320 may be formed by an injection molding process that includes a plurality of reinforcement inserts 324 overmolded by the body 322. In addition, during the injection molding process, a series of holes 1328 may be formed in the body 322 of the support structure 320. The holes 1328 formed in the body 322 may be utilized to assemble the support structure 320, the thermal component 330, and the acoustic component 350 together. The holes 1328 in the support structure 320 may be provided in addition to the series of holes 1326c in the metal insert 1326 if provided, or holes formed in the extension of the support structure as previously discussed.

Figure 14:
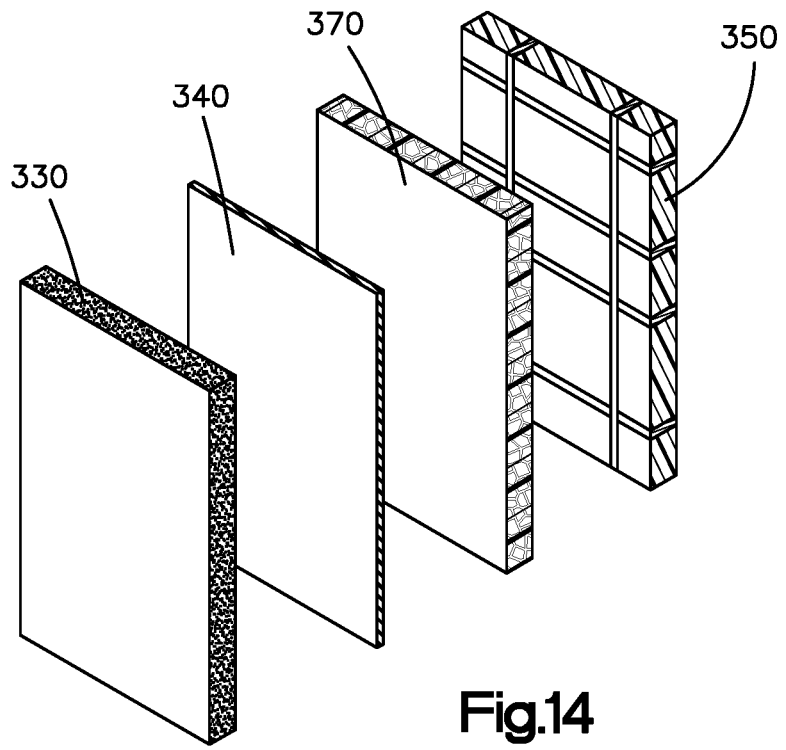
FIG. 14 is a schematic exploded view of a bulkhead, according to one aspect of the disclosure.

FIG. 14 illustrates a schematic exploded view of the bulkhead 110, according to an aspect of the disclosure. The acoustic component 350 illustrated in FIG. 14 only includes the resonator 370. The resonator 370 may be monolithic with support structure 320.

Figure 15:
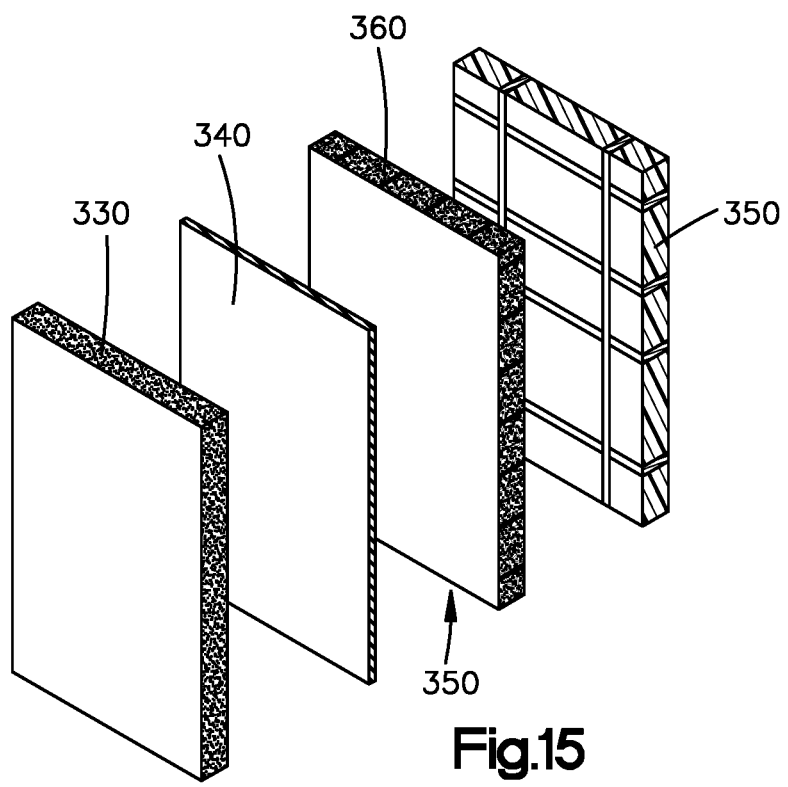
FIG. 15 is a schematic exploded view of a bulkhead, according to one aspect of the disclosure.

FIG. 15 illustrates a schematic exploded view of the bulkhead 110, according to an aspect of the disclosure. As illustrated in FIG. 15, the acoustic component 350 only includes the foam layer 360. The foam layer 360 may be monolithic with support structure 320.

FIG. 16 illustrates a schematic cross-sectional top view of a bulkhead 110, according to an aspect of the disclosure. As illustrated in FIG. 16, the bulkhead 110 includes fasteners 1644 that fasten together the support structure 320, the acoustic component 350, and the thermal component 330. The fasteners 1644 may be driven through the holes 1328 formed in the body 322 of the support structure 320. The adhesive component 340 in the form of a structural adhesive may be provided between the acoustic component 350 and the thermal component 330. Thus the fasteners 1644 may only be needed to fasten the support structure 320 to the other components of the bulkhead 110.

FIG. 17 illustrates a schematic cross-sectional top view of the bulkhead 110, according to an aspect of the disclosure. In FIG. 17, the adhesive component 340 in the form of a structural adhesive is not provided. Thus, each component of the bulkhead is fastened to the other components by the fasteners 1644.

The bulkhead 110 of the disclosure, including any of the various aspects described herein with reference to FIGS. 3-17, may include a metal frame (not shown and separate from a frame that may be provided by the reinforcement inserts 324) that may be attached, via an adhesive or injection molding process for example, to the bulkhead 110. Therefore, the at least one mounting portion may include such a metal frame which may couple the bulkhead 110 to the automobile frame 102. Such a metal frame may be attached to or extend from either the support structure 320 or the thermal component 330 and be welded otherwise fastened to the automobile frame 102.

Figure 18:
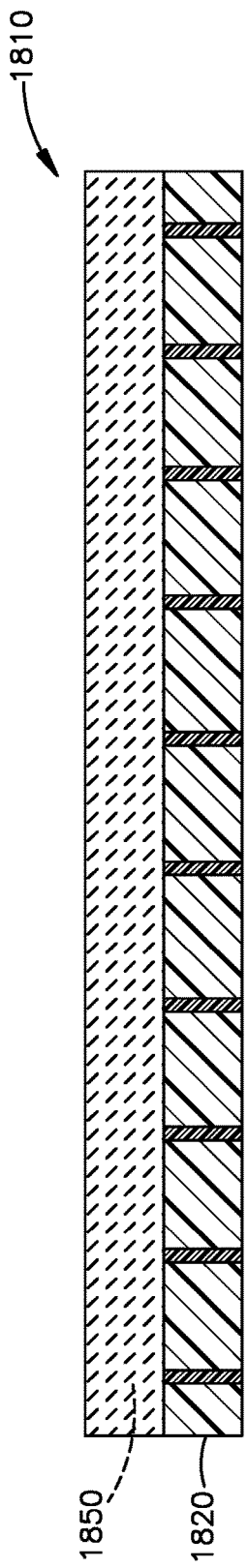
FIG. 18 is a schematic cross-sectional top view of a bulkhead, according to one aspect of the disclosure.

FIG. 18 illustrates a schematic cross-sectional top view of a bulkhead 1810, according to an aspect of the disclosure. The bulkhead 1810 is a one piece bulkhead including a support structure 1820 and an acoustic component 1850 similar to the support structure 320 and acoustic component 350.

Figures 19A, 19B, 19C:
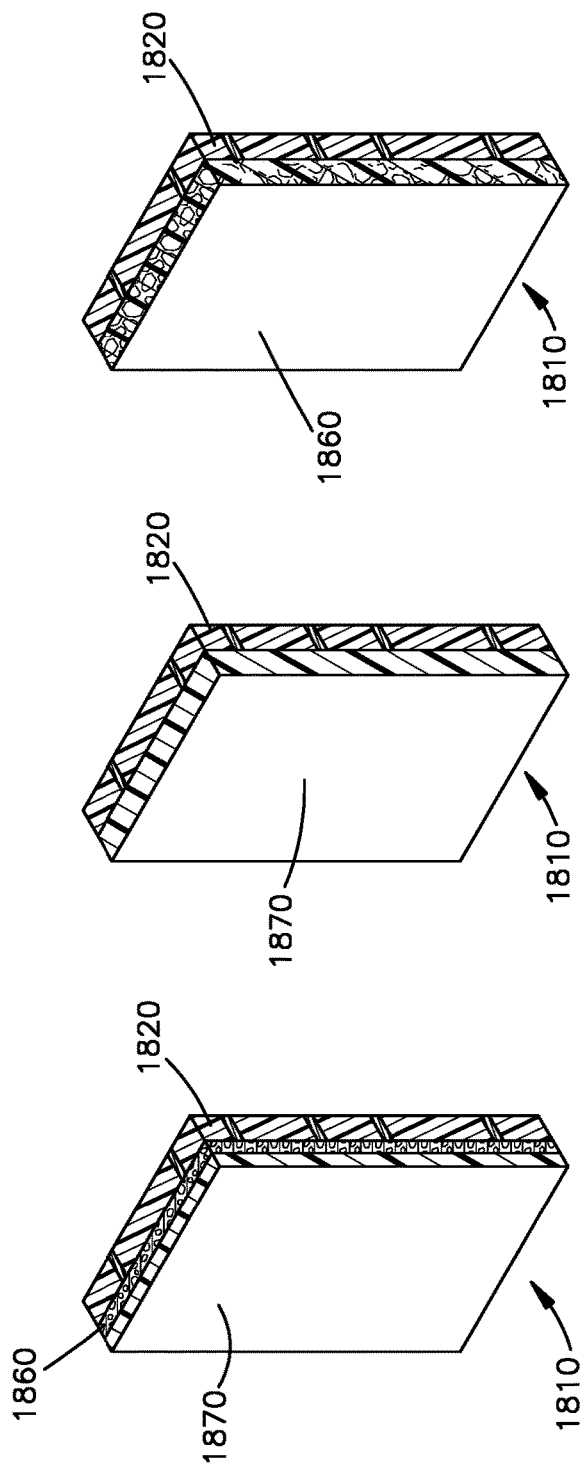
FIG. 19A is a schematic perspective view of the bulkhead illustrated in FIG. 18, according to one aspect of the disclosure.
FIG. 19B is a schematic perspective view of the bulkhead illustrated in FIG. 18, according to another aspect of the disclosure.
FIG. 19C is a schematic perspective view of the bulkhead illustrated in FIG. 18, according to another aspect of the disclosure.

FIGS. 19A-C illustrate schematic perspective side elevation views of the bulkhead 1810, according to aspects of the disclosure. In particular, the bulkhead 1810 as illustrated in FIG. 19A includes the support structure 1820, and the acoustic component 1850 includes a foam layer 1860 and a resonator 1870. The bulkhead 1810 as illustrated in FIG. 19B includes the support structure 1820, and the acoustic component 1850 includes the resonator 1870. The bulkhead 1810 as illustrated in FIG. 19C includes the support structure 1820, and the acoustic component 1850 includes the foam layer 1860.

Figure 20:
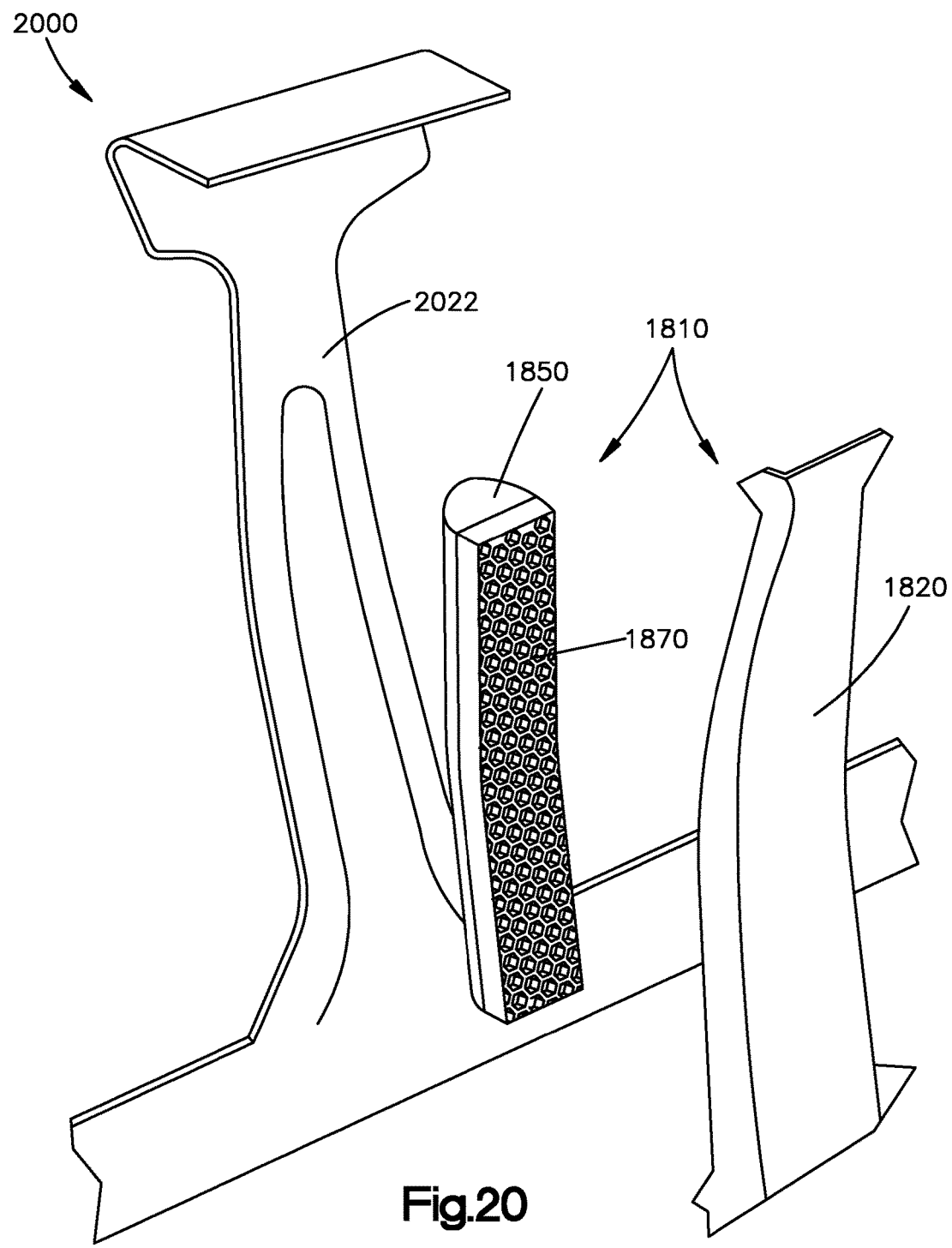
FIG. 20 is an exploded view of a pillar assembly including the bulkhead of FIG. 18, according to one aspect of the disclosure.

FIG. 20 illustrates an exploded view of a pillar assembly 2000 including the bulkhead 1810 of FIG. 18, according to an aspect of the disclosure. The pillar assembly 2000 may include a pillar 2022 that extends in a direction perpendicular to a width of an automobile (not shown), and a recess 2004 that may extend within the pillar 2022 along a direction parallel to the width of the automobile. The support structure 1820, shown separate from the acoustic component 1850 for clarity, may provide a panel facing an interior of the automobile, and in particular a passenger compartment (not shown). The acoustic component 1850, which is normally monolithic with the support structure 1820, may be positioned between the support structure 1820 and the pillar 2022, such that the acoustic component 1850 fits within the recess 2004. The acoustic component 1850 includes the resonator 1870 provided with a plurality of cells 1872 of a honeycomb matrix 1874. A perforated thermoplastic layer (not shown) may be positioned between the acoustic component 1850 and the pillar 2022. In addition, a fabric layer (not shown) may be provided between the resonator 1870 and the pillar 2022. The bulkhead 1810 in the pillar 2022 may provide an acoustic damping effect that reduces the transmission of noise from outside of the automobile into a passenger compartment.

It will be appreciated that the disclosure may include any one and up to all of the following examples:

EXAMPLE 1

A bulkhead configured to be coupled to an automobile frame between an engine compartment and a passenger compartment, the bulkhead comprising:

a support structure including a body and at least one reinforcement insert embedded within at least a portion of the body;

a thermal component positioned on a side of the support structure configured to be disposed proximate to the engine compartment;

at least one mounting portion; and an acoustic component positioned between the support structure and the thermal component, wherein the acoustic component defines a plurality of openings on a side of the acoustic component disposed proximate to the thermal component, wherein the acoustic component includes a plurality of cells extending in a first direction from the support structure towards the thermal component, wherein each cell of the plurality of cells defines a first volume in fluid communication with at least one opening of the plurality of openings, wherein a cross-sectional area of each opening of the plurality of openings is less than a cross-sectional area of a corresponding first volume.

EXAMPLE 2

The bulkhead as recited in example 1, wherein the plurality of cells are arranged within a plurality of rows, wherein a longitudinal direction of the bulkhead is perpendicular to the first direction, wherein a second direction is perpendicular to the longitudinal direction and the first direction, wherein a respective dimension along the longitudinal direction corresponds to a length of each cell and a length of each row, and wherein a respective dimension along the second direction corresponds to a height of each cell and a height of each row.

EXAMPLE 3

The bulkhead as recited in example 2, wherein the plurality of rows are arranged along the longitudinal direction, and wherein each row of the plurality of rows extends along the second direction.

EXAMPLE 4

The bulkhead as recited in example 3, wherein respective lengths the plurality of rows vary along the longitudinal direction.

EXAMPLE 5

The bulkhead as recited in example 3, wherein respective lengths of the plurality of rows are equal along the longitudinal direction.

EXAMPLE 6

The bulkhead as recited in any one of examples 4 to 5, wherein respective heights of respective cells within each row of the plurality of rows vary along the second direction.

EXAMPLE 7

The bulkhead as recited in any one of examples 4 to 5, wherein respective heights of respective cells within each row of the plurality of rows are equal along the second direction.

EXAMPLE 8

The bulkhead as recited in example 2, wherein the plurality of rows are arranged along the second direction, and wherein each row of the plurality of rows extends along the longitudinal direction.

EXAMPLE 9

The bulkhead as recited in example 8, wherein respective heights of the plurality of rows vary along the second direction.

EXAMPLE 10

The bulkhead as recited in example 8, wherein respective heights of the plurality of rows are equal along the second direction.

EXAMPLE 11

The bulkhead as recited in any one of examples 9 to 10, wherein respective lengths of respective cells within each row of the plurality of rows vary along the longitudinal direction.

EXAMPLE 12

The bulkhead as recited in any one of examples 9 to 10, wherein respective lengths of respective cells within each row of the plurality of rows are equal along the longitudinal direction.

EXAMPLE 13

The bulkhead as recited in any one of examples 2-13, wherein the length and the height of each row of the plurality of rows and the length and the height of each cell of the plurality of cells are sized such that respective first volumes of the plurality of cells are tuned according to a resonant frequency corresponding to an excitation frequency of one of a combined region adjacent to the bulkhead and an immediate region adjacent to each respective cell.

EXAMPLE 14

The bulkhead as recited in any one of examples 2 to 5 and 8 to 10, wherein each cell of the plurality of cells is defined as an entire row within the plurality of rows, and wherein each cell includes a respective first volume in fluid communication with more than one opening of the plurality of openings defined by the acoustic component.

EXAMPLE 15

The bulkhead as recited in any one of examples 1 to 14, wherein the plurality of cells are formed in a housing including a first wall disposed proximate to the support structure and a second wall disposed proximate to the thermal component, wherein the plurality of openings are formed within the second wall.

EXAMPLE 16

The bulkhead as recited in any one of examples 1 to 14, wherein the acoustic component includes a mounting plate and a double-wall sheet mounted to the mounting plate, wherein the mounting plate defines a first wall of the acoustic component disposed proximate to the support structure, wherein a side of the double-wall sheet defines a second wall of the acoustic component disposed proximate to the thermal component, and wherein the plurality of openings are formed in the second wall.

EXAMPLE 17

The bulkhead as recited in any one of examples 15 to 16, wherein the first wall includes a plurality of protrusions extending from the first wall in the first direction towards the thermal component, wherein each protrusion extends within one cell of the plurality of cells across a cross-sectional area of a first volume defined by a respective one cell.

EXAMPLE 18

The bulkhead as recited in example 17, wherein each protrusion of the plurality of protrusions extends a same distance along the first direction from the first wall.

EXAMPLE 19

The bulkhead as recited in example 17, wherein the plurality of protrusions extend varying distances along the first direction from the first wall.

EXAMPLE 20

The bulkhead as recited in any one of examples 18 to 19, wherein the plurality of protrusions extend respective distances from the first wall such that respective first volumes of the plurality of cells are tuned according to the resonant frequency corresponding to the excitation frequency of one of the combined region adjacent to the bulkhead and the immediate region adjacent to each respective cell.

EXAMPLE 21

The bulkhead as recited in any one of examples 1 to 14, wherein the plurality of cells are formed by a plurality of ribs extending in the first direction and a plurality of transverse walls, wherein each cell of the plurality of cells is formed by a respective pair of ribs and a respective transverse wall extending between the respective pair of ribs, and wherein each transverse wall of the plurality of transverse walls is positioned at a respective location along the first direction.

EXAMPLE 22

The bulkhead as recited in example 21, wherein the plurality of ribs are formed from a first material.

EXAMPLE 23

The bulkhead as recited in example 22, wherein the plurality of ribs are overmolded.

EXAMPLE 24

The bulkhead as recited in any one of examples 21 to 22, wherein the plurality of transverse walls are formed from the first material.

EXAMPLE 25

The bulkhead as recited in any one of examples 21 to 22, wherein the plurality of transverse walls are formed from a second material different from the first material.

EXAMPLE 26

The bulkhead as recited in any one of examples 21 to 25, wherein the acoustic component includes a structural layer attached to ends of the plurality of ribs disposed proximate to the thermal component, wherein the structural layer defines the plurality of openings.

EXAMPLE 27

The bulkhead as recited in example 26, wherein the structural layer is formed from a material including at least one metallic component, and wherein the structural layer is welded to the ends of the plurality of ribs.

EXAMPLE 28

The bulkhead as recited in example 26, wherein one of the ends of the plurality of ribs and a surface of the structural layer disposed proximate to the ends of the plurality of ribs includes a plurality of studs extending therefrom, wherein the other of the ends of the plurality of ribs and the surface of the structural layer includes a plurality of slots corresponding to the plurality of studs, and wherein the plurality of studs are deformed according to an interference fit between the plurality of studs and the plurality of slots.

EXAMPLE 29

The bulkhead as recited in any one of examples 26 to 28, wherein the structural layer is attached to the plurality of ribs by at least one clip positioned between the ribs and the structural layer.

EXAMPLE 30

The bulkhead as recited in any one of examples 21 to 28, wherein each transverse wall includes a first surface that faces the thermal component along the first direction and a second surface that faces the support structure along the first direction, wherein for each cell of the plurality of cells a respective first surface defines a respective first volume in fluid communication with a respective at least one opening and a respective second surface defines a respective second volume.

EXAMPLE 31

The bulkhead as recited in example 30, wherein each second volume defines an empty space between a respective transverse wall and the support structure.

EXAMPLE 32

The bulkhead as recited in example 30, wherein each second volume is fill with one of a structural foam and a chemical foam.

EXAMPLE 33

The bulkhead as recited in any one of examples 21 to 32, wherein a location of each transverse wall of the plurality of transverse walls is positioned along the first direction so that respective first volumes of the plurality of cells are tuned according to the resonant frequency corresponding to the excitation frequency of one of the combined region adjacent to the bulkhead and the immediate region adjacent to each respective cell.

EXAMPLE 34

The bulkhead as recited in any one of examples 1 to 13, wherein the plurality of cells are formed by a honeycomb matrix.

EXAMPLE 35

The bulkhead as recited in example 34, wherein each cell of the plurality of cells defines a polygon-shaped cell.

EXAMPLE 36

The bulkhead as recited in any one of examples 34 to 35, wherein the acoustic component includes a thermoplastic layer positioned between the support structure and the plurality of cells.

EXAMPLE 37

The bulkhead as recited in example 36, wherein the thermoplastic layer is attached to the plurality of cells by an adhesive film.

EXAMPLE 38

The bulkhead as recited in example 36, wherein the thermoplastic layer is monolithic with the plurality of cells.

EXAMPLE 40

The bulkhead as recited in any one of examples 36 to 38, wherein the thermoplastic layer includes a plurality of protrusions extending from the thermoplastic layer in the first direction towards the thermal component, wherein each protrusion extends within one cell of the plurality of cells across a cross-sectional area of a first volume defined by a respective one cell.

EXAMPLE 41

The bulkhead as recited in example 40, wherein each protrusion of the plurality of protrusions extends a same distance along the first direction from the first wall.

EXAMPLE 42

The bulkhead as recited in example 40, wherein the plurality of protrusions extend varying distances along the first direction from the first wall.

EXAMPLE 43

The bulkhead as recited in any one of examples 41 to 42, wherein the plurality of protrusions extend respective distances from the first wall such that respective first volumes of the plurality of cells are tuned according to the resonant frequency corresponding to the excitation frequency of one of the combined region adjacent to the bulkhead and the immediate region adjacent to each respective cell.

EXAMPLE 44

The bulkhead as recited in any one of examples 37 to 38, wherein each cell in at least a portion of the plurality of cells includes a body of material extending across a cross-sectional area of a respective first volume defined by the cell.

EXAMPLE 45

The bulkhead as recited in example 44, wherein each body of material extends a same distance along the first direction from the first wall.

EXAMPLE 46

The bulkhead as recited in example 44, wherein each body of material extends a respective distance along the first direction from the first wall, and
wherein respective distances of the bodies of material vary.

EXAMPLE 47

The bulkhead as recited in any one of examples 44 to 46, wherein each body of material is formed by one of a chemical foam and a physical foam.

EXAMPLE 48

The bulkhead as recited in any one of examples 44 to 47, wherein the body material for the portion of the plurality of cells extend respective distances from the first wall such that respective first volumes of the plurality of cells are tuned according to the resonant frequency corresponding to the excitation frequency of one of the combined region adjacent to the bulkhead and the immediate region adjacent to each respective cell.

EXAMPLE 49

The bulkhead as recited in any one of examples 34 to 48, wherein the acoustic component includes a perforated thermoplastic layer positioned between the plurality of cells and the thermal component,
wherein the perforated thermoplastic layer defines the plurality of openings.

EXAMPLE 50

The bulkhead as recited in any one of examples 1 to 49, wherein the acoustic component includes a fabric layer positioned between the plurality of cells and the thermal component along the first direction.

EXAMPLE 51

The bulkhead as recited in any one of examples 1 to 14, 21 to 25, and 34 to 48, wherein the acoustic component includes a fabric layer positioned between the plurality of cells and the thermal component along the first direction,
wherein the fabric layer defines the plurality of openings.

EXAMPLE 52

The bulkhead as recited in any one of examples 1 to 50, wherein a dimension of the plurality of openings along the first direction defines a thickness of each opening of the plurality of openings,
wherein respective thicknesses of the plurality of openings are a same thickness, and
wherein respective cross-sectional areas of the plurality of openings vary.

EXAMPLE 53

The bulkhead as recited in any one of examples 1 to 50, wherein a dimension of the plurality of openings along the first direction defines a thickness of each opening of the plurality of openings,
wherein respective thicknesses of the plurality of openings vary, and
wherein respective cross-sectional areas of the plurality of openings are a same cross-sectional.

EXAMPLE 54

The bulkhead as recited in any one of examples 1 to 50, wherein a dimension of the plurality of openings along the first direction defines a thickness of each opening of the plurality of openings,
wherein respective thicknesses of the plurality of openings vary, and
wherein respective cross-sectional areas of the plurality of openings vary.

EXAMPLE 55

The bulkhead as recited in any one of examples 1 to 50, wherein a dimension of the plurality of openings along the first direction defines a thickness of each opening of the plurality of openings,
wherein respective thicknesses of the plurality of openings are a same thickness, and
wherein respective cross-sectional areas of the plurality of openings are a same cross-sectional area.

EXAMPLE 56

The bulkhead as recited in any one of examples 1 to 55, wherein the plurality of cells is monolithic with the support structure.

EXAMPLE 57

The bulkhead as recited in any one of examples 1 to 55, wherein the support structure is attached to the plurality of cells by a layer of structural adhesive.

EXAMPLE 58

The bulkhead as recited in any one of examples 1 to 55, wherein the plurality of cells are molded to the support structure.

EXAMPLE 59

The bulkhead as recited in any one of examples 1 to 55, wherein the acoustic component includes a foam layer extending from the plurality of cells and adjacent to the support structure.

EXAMPLE 60

The bulkhead as recited in example 59, wherein the foam layer is one of a chemical foam layer and a physical foam layer.

EXAMPLE 61

The bulkhead as recited in any one of examples 59 to 60, wherein the foam layer is attached to the support structure by a layer of structural adhesive.

EXAMPLE 62

The bulkhead as recited in any one of examples 59 to 60, wherein the foam layer is monolithic with the support structure.

EXAMPLE 63

The bulkhead as recited in any one of examples 60 to 62, wherein the plurality of cells are formed in a layer from a first thermoplastic material.

EXAMPLE 64

The bulkhead as recited in example 63, wherein the foam layer is formed from the first thermoplastic material.

EXAMPLE 65

The bulkhead as recited in example 63, wherein the layer of foam is formed from a second thermoplastic material.

EXAMPLE 66

The bulkhead as recited in any one of examples 60 to 64, wherein the foam layer is monolithic with the layer forming the plurality of cells.

EXAMPLE 67

The bulkhead as recited in any one of examples 60 to 65, wherein the layer forming the plurality of cells is molded to the foam layer.

EXAMPLE 68

The bulkhead as recited in any one of examples 1 to 67, wherein a thermal conductively of the thermal component is less than at least a thermal conductivity of the support structure.

EXAMPLE 69

The bulkhead as recited in any one of examples 1 to 68, wherein the thermal component is formed as a thermoplastic member, and
wherein the thermoplastic member is attached to the acoustic component

EXAMPLE 70

The bulkhead as recited in any one of examples 1 to 68, wherein the thermal component is formed by at least one heat shield, and
wherein the at least one heat shield is attached to the acoustic component.

EXAMPLE 71

The bulkhead as recited in any one of examples 1 to 70, wherein the thermal component is attached to the acoustic member by a layer of structural adhesive.

EXAMPLE 72

The bulkhead as recited in any one of examples 1 to 70, wherein the thermal component defines an insert member molded to the acoustic component.

EXAMPLE 73

The bulkhead as recited in any one of examples 1 to 72, wherein thermal component includes one of a layer and a surface formed by at least one of aluminum, glass wool, a silver coating, and a ceramic material.

EXAMPLE 74

The bulkhead as recited in any one of examples 1 to 73, wherein the at least one reinforcement insert is formed by a metal insert,
wherein the body of the support structure is overmolded to the metal insert, and
wherein the metal insert extends along the longitudinal direction from at least one edge of the bulkhead.

EXAMPLE 75

The bulkhead as recited in example 74, wherein the metal insert includes a plurality of holes formed within a portion of the first metal insert extending past the at least one edge of the bulkhead, and
wherein the plurality of holes define the at least one mounting portion of the bulkhead.

EXAMPLE 76

The bulkhead as recited in any one of examples 1 to 73, wherein a mounting portion includes a main coupler,
wherein the at least one reinforcement insert is an extension member of the main coupler that extends from a body of the main coupler towards the bulkhead along the longitudinal direction,
wherein the extension member is overmolded by the body of the support structure,
wherein the body of the main coupler is adjacent to an edge of at least the support structure and the acoustic component, and
wherein a dimension of the main coupler along the first direction defines a thickness of the bulkhead.

EXAMPLE 77

The bulkhead as recited in example 76, wherein the body of the main coupler defines a plurality of holes extending through the body along the first direction.

EXAMPLE 78

The bulkhead as recited in example 77, wherein at least one surface of the body of the main coupler is formed from a metal material.

EXAMPLE 79

The bulkhead as recited in any one of examples 74 to 78, wherein the support structure includes a plurality of localized reinforcement inserts embedded within the body of the support structure.

EXAMPLE 80

The bulkhead as recited in any one of examples 1 to 73, wherein the at least one reinforcement insert is one of a plurality of localized reinforcement inserts embedded within the body of the support structure.

EXAMPLE 81

The bulkhead as recited in example 80, wherein the support structure includes at least one extension that extends past the thermal component and the acoustic component along the longitudinal direction,
wherein a plurality of holes are formed in the extension and define the at least one mounting portion.

EXAMPLE 82

The bulkhead as recited in any one of examples 79 to 82, wherein the plurality of localized reinforcement inserts define a plurality rows extending along the longitudinal direction of the bulkhead.

EXAMPLE 83

The bulkhead as recited in any one of examples 79 to 82, wherein the plurality of localized reinforcement inserts define a plurality of rows extending along a second direction perpendicular to the longitudinal direction and the first direction.

EXAMPLE 84

The bulkhead as recited in any one of examples 79 to 83, wherein the plurality of localized reinforcement inserts are formed from at least one of unidirectional tape and a resin impregnated fabric.

EXAMPLE 85

The bulkhead as recited in any one of examples 1 to 85, further comprising a plurality of bulkhead fasteners,
wherein the body of the support structure is formed by injection molding and includes a plurality of receiving holes formed through the body, and
wherein the bulkhead fasteners extend along the first direction through the support structure, the acoustic component, and thermal component to fasten the bulkhead together.

EXAMPLE 86

The bulkhead as recited in any one of examples 1 to 85, wherein the support structure, the acoustic component, and thermal component are fastened together by a plurality of the adhesive layers to form an assembly defining the bulkhead.

EXAMPLE 87

The bulkhead as recited in any one of examples 1 to 86, wherein the at least one mounting portion includes a metal frame configured to couple the bulkhead to the automobile frame.

EXAMPLE 88

The bulkhead as recited in example 87, wherein the metal frame extends from one of the support structure and the thermal component.

EXAMPLE 89

The bulkhead as recited in example 87, wherein the metal frame extends from edges of the bulkhead extending in a second direction perpendicular to the first direction and the longitudinal direction.

EXAMPLE 90

An automobile frame assembly comprising:
the automobile frame as recited in example 1; and
the bulkhead as recited in any one of examples 1 to 86,
wherein the frame assembly defines the engine compartment and the passenger compartment, and
wherein the support structure is disposed proximate to the passenger compartment.

EXAMPLE 91

The automobile frame assembly as recited in example 90, wherein the bulkhead extends along the longitudinal direction across a width of the automobile frame.

EXAMPLE 92

The automobile frame assembly as recited in example 90, wherein the bulkhead extends along the longitudinal direction a portion of a width of the automobile frame.

EXAMPLE 93

The automobile frame assembly as recited in any one of examples 90 to 92, wherein the at least one mounting portion extends from an edge of the bulkhead and is fastened to the automobile frame.

EXAMPLE 94

The automobile frame assembly as recited in any one of examples 90 to 93, further comprising a transmission tunnel positioned below the bulkhead and extending from the bulkhead into the passenger compartment.

EXAMPLE 95

The automobile frame assembly as recited in example 94, wherein the at least one mounting portion extends from an edge of the bulkhead and is fastened to the transmission tunnel.

EXAMPLE 96

A method of assembling a front car of an automobile, the method comprising:
attaching the at least one mounting portion of the bulkhead as recited in anyone of examples 1 to 89 to the automobile frame as recited in example 1,
wherein the attaching includes forming an air tight attachment between the at least one mounting portion and the automobile frame.

EXAMPLE 97

The method as recited in example 96, wherein the attaching includes driving a plurality of fasteners through the at least one mounting portion and the automobile frame.

EXAMPLE 98

The method as recited in example 96, wherein the attaching includes welding the at least one mounting portion to the automobile frame.

EXAMPLE 99

A method of fabricating the bulkhead as recited in any one of examples 1 to 89, the method comprising:
forming the body of the support structure by injection molding, and
forming the acoustic component by injection molding,
wherein forming the body of the support structure includes overmolding the at least one reinforcement insert within the body.

EXAMPLE 100

The method as recited in example 96, further comprising attaching the thermal component to a side of the acoustic component defining the plurality of openings.

EXAMPLE 101

A pillar assembly extending along a first direction perpendicular to a width of an automobile, the pillar assembly comprising:
a pillar defining a recess extending along the first direction within pillar;
a support structure including a body and at least one insert embedded within at least a portion of the body; and
an acoustic component positioned between the support structure and the pillar,
wherein the acoustic component fits within the recess, and
wherein the acoustic component includes a plurality of cells extending in a second direction from the support structure towards the pillar,
wherein each cell of the plurality of cells defines a volume in fluid communication with at least one opening of the plurality of openings,
wherein a cross-sectional area of each opening of the plurality of openings is less than a cross-sectional area of a corresponding volume.

EXAMPLE 102

The pillar assembly as recited in example 101, further comprising a perforated thermoplastic layer positioned between the acoustic component and the pillar.

EXAMPLE 103

The pillar assembly as recited in any one of examples 100 to 102, further comprising a fabric layer posited between the plurality of cells and pillar,
wherein the fabric layer defines a layer of the acoustic component proximate to the pillar.

EXAMPLE 104

The pillar assembly as recited in any one of examples 100 to 103, wherein a size and shape of the plurality of cells vary along first direction and a third direction perpendicular to the first direction and the second direction.

EXAMPLE 105

The pillar assembly as recited in example 104, wherein each cell in at least a portion of the plurality of cells includes a body of material extending across a cross-sectional area of a respective volume defined by the cell.

EXAMPLE 106

The bulkhead as recited in example 105, wherein each body of material extends a same distance along the second direction within a respective cell.

EXAMPLE 107

The bulkhead as recited in example 106, wherein each body of material extends a respective distance along the second direction within a respective cell, and
wherein respective distances of the bodies of material vary.

EXAMPLE 108

The bulkhead as recited in any one of examples 105 to 106, wherein each body of material is formed by one of a chemical foam and a physical foam.

EXAMPLE 109

The bulkhead as recited in any one of examples 105 to 108, wherein the body material for the portion of the plurality of cells extend respective distances along the second direction such that respective volumes of the plurality of cells are tuned according to a resonant frequency corresponding to an excitation frequency of one of the combined region adjacent to the pillar assembly and an immediate region adjacent to each respective cell.

EXAMPLE 110

The bulkhead as recited in any one of examples 104 to 108, wherein the size and shape of the plurality of cells are dimensioned such that respective volumes of the plurality of cells are tuned according to a resonant frequency corresponding to an excitation frequency of one of the combined region adjacent to the pillar assembly and an immediate region adjacent to each respective cell.

Aspects of the disclosure described in connection with illustrated aspects have been presented by way of illustration, and the disclosure is therefore not intended to be limited to the disclosed aspects. Furthermore, the structure and features of each aspect described herein can be applied to the other aspects described herein. Accordingly, those skilled in the art will realize that the disclosure is intended to encompass all modifications and alternative arrangements included within the spirit and scope of the disclosure, as set forth by the appended claims.

It is noted that as used in the specification and the appending claims the singular forms "a," "an," and "the" can include plural references unless the context dictates otherwise.

Unless specified otherwise, the terms "substantial" or "substantially" as used herein mean "considerable in extent," or "largely but not necessarily wholly that which is specified."

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed:

1. A bulkhead configured to be disposed between an engine compartment and a passenger compartment, the bulkhead comprising:
a support structure defining a first support side configured to face the engine compartment, and a second support side opposite the first support side, the support structure including at least one reinforcement member and a body supported by the reinforcement member;
a thermally insulative component supported by the first support side of the support structure; and
an acoustic resonator defining a first resonator side that faces the support structure, a second resonator side that faces the thermally insulative component, and a plurality of openings that extend along a first direction from the second resonator side toward the first resonator side and terminate at a location between the first resonator side and the second resonator side,
wherein the acoustic resonator includes a plurality of cells that each defines a respective first open volume that is in fluid communication with at least one of the plurality of openings, and
wherein each of the plurality of openings defines a respective cross-sectional area along a first plane that is oriented perpendicular to the first direction, each of the respective first open volumes defines a respective cross-sectional area along a second plane that is parallel to the first plane, and the respective cross-sectional area of each of the plurality of openings is less than the respective cross-sectional area of each of the first open volumes.

2. The bulkhead of claim 1, wherein at least a portion of the reinforcement member is disposed in the body.

3. The bulkhead of claim 1, wherein the bulkhead further comprises at least one mounting portion configured to attach to an automobile frame.

4. The bulkhead of claim 1, wherein the plurality of cells are arranged in a plurality of rows, the bulkhead has a length along a longitudinal direction that is perpendicular to the first direction, and a height along a second direction that is perpendicular to both the first direction and the longitudinal direction,
wherein each cell has a length along a longitudinal direction that is perpendicular to the first direction, and a height along a second direction that is perpendicular to both the first direction and the longitudinal direction, and
wherein each row has a length along a longitudinal direction that is perpendicular to the first direction, and a height along a second direction that is perpendicular to both the first direction and the longitudinal direction.

5. The bulkhead of claim 4, wherein the length and the height of each row of the plurality of rows and the length and the height of each cell of the plurality of cells are sized such that respective first volumes of the plurality of cells are tuned according to a resonant frequency corresponding to an excitation frequency of one of a combined region adjacent to the bulkhead and an immediate region adjacent to each respective cell.

6. The bulkhead as recited in claim 1, wherein the acoustic resonator comprises a resonator wall that comprises a mounting plate and a plurality of protrusions that project in a direction from the first resonator side to the second resonator side, such that the first open volumes are defined between the protrusions and the second resonator side.

7. The bulkhead as recited in claim 1, wherein the acoustic resonator further comprises:
a plurality of ribs that extend from a first resonator wall toward a second resonator wall along the first direction, and are spaced from each other along a direction perpendicular to the first direction so as to define the cells such that each of the cells is defined between an adjacent ones of the ribs and a plurality of transverse walls that extends between respective pairs of the ribs,
wherein at least a pair of the plurality of transverse walls is positioned at respective different locations along the first direction.

8. The bulkhead as recited in any one of claim 1, wherein the plurality of cells combine to define a honeycomb matrix.

9. An automobile frame assembly comprising:
an automobile frame; and
the bulkhead as recited in claim 1,
wherein the frame assembly defines the engine compartment and the passenger compartment, and
wherein the support structure is disposed proximate to the passenger compartment.

10. A method of fabricating a bulkhead, the method comprising:
providing a support structure defining a first support side configured to face an engine compartment, and a second support side opposite the first support side, the support structure including at least one reinforcement member and a body supported by the reinforcement member;
providing a thermally insulative component supported by the first support side of the support structure; and
providing an acoustic resonator defining a first resonator side that faces the support structure, a second resonator side that faces the thermally insulative component, and a plurality of openings that extend along a first direction from the second resonator side toward the first resonator side and terminate at a location between the first resonator side and the second resonator side,
wherein the acoustic resonator includes a plurality of cells that each defines a respective first open volume that is in fluid communication with at least one of the plurality of openings, and
wherein each of the plurality of openings defines a respective cross-sectional area along a first plane that is oriented perpendicular to the first direction, each of the respective first open volumes defines a respective cross-sectional area along a second plane that is parallel to the first plane, and the respective cross-sectional area of each of the plurality of openings is less than the respective cross-sectional area of each of the first open volumes.

11. The method of fabricating the bulkhead according to claim 10 further comprising:
overmolding the body of the support structure onto the at least one reinforcement member.

12. The method of fabricating the bulkhead according to claim 10 further comprising:
injection molding the acoustic resonator.

13. The method of fabricating the bulkhead according to claim 10, wherein at least a portion of the reinforcement member is disposed in the body.

14. The method of fabricating the bulkhead according to claim 10, wherein the bulkhead further comprises at least one mounting portion configured to attach to an automobile frame.

15. The method of fabricating the bulkhead according to claim 10, wherein the plurality of cells are arranged in a plurality of rows, the bulkhead has a length along a longitudinal direction that is perpendicular to the first direction, and a height along a second direction that is perpendicular to both the first direction and the longitudinal direction, wherein each cell has a length along a longitudinal direction that is perpendicular to the first direction, and a height along a second direction that is perpendicular to both the first direction and the longitudinal direction, and wherein each row has a length along a longitudinal direction that is perpendicular to the first direction, and a height along a second direction that is perpendicular to both the first direction and the longitudinal direction.

\* \* \* \* \*